United States Patent
Lamberts et al.

(10) Patent No.: US 11,041,047 B2
(45) Date of Patent: Jun. 22, 2021

(54) CONDUCTIVE THERMOPLASTIC POLYAMIDE MOLDING COMPOUND

(71) Applicant: EMS-PATENT AG, Domat/Ems (CH)

(72) Inventors: Nikolai Lamberts, Bonaduz (CH); Andreas Bayer, Domat/Ems (CH)

(73) Assignee: EMS-PATENT AG, Domat/Ems (CH)

( * ) Notice: Subject to any disclaimer, the term of this patent is extended or adjusted under 35 U.S.C. 154(b) by 47 days.

(21) Appl. No.: 16/317,411

(22) PCT Filed: Jul. 10, 2017

(86) PCT No.: PCT/EP2017/067241
§ 371 (c)(1),
(2) Date: Jan. 11, 2019

(87) PCT Pub. No.: WO2018/011131
PCT Pub. Date: Jan. 18, 2018

(65) Prior Publication Data
US 2019/0225750 A1 Jul. 25, 2019

(30) Foreign Application Priority Data
Jul. 13, 2016 (EP) .................... 16179233

(51) Int. Cl.
| | |
|---|---|
| *C08G 69/26* | (2006.01) |
| *C08K 7/06* | (2006.01) |
| *C08K 7/14* | (2006.01) |
| *C08L 77/06* | (2006.01) |
| *C08L 23/00* | (2006.01) |
| *C08L 23/26* | (2006.01) |
| *B29C 45/00* | (2006.01) |
| *B29C 49/04* | (2006.01) |
| *C08G 69/14* | (2006.01) |
| *C08L 23/08* | (2006.01) |
| *C08L 51/00* | (2006.01) |
| *C08L 53/02* | (2006.01) |
| *B29K 77/00* | (2006.01) |

(52) U.S. Cl.
CPC ........ *C08G 69/265* (2013.01); *B29C 45/0005* (2013.01); *B29C 49/04* (2013.01); *C08G 69/14* (2013.01); *C08K 7/06* (2013.01); *C08K 7/14* (2013.01); *C08L 23/00* (2013.01); *C08L 23/0853* (2013.01); *C08L 23/26* (2013.01); *C08L 51/003* (2013.01); *C08L 53/025* (2013.01); *C08L 77/06* (2013.01); *B29K 2077/10* (2013.01); *C08K 2201/001* (2013.01); *C08K 2201/003* (2013.01); *C08K 2201/004* (2013.01)

(58) Field of Classification Search
CPC ................ C08L 77/00–12; C08L 2666/55–58
See application file for complete search history.

(56) References Cited

U.S. PATENT DOCUMENTS

| | | | |
|---|---|---|---|
| 3,454,536 A | 7/1969 | Schade et al. | |
| 3,839,296 A | 10/1974 | Campbell | |
| 3,843,611 A | 10/1974 | Campbell | |
| 4,607,073 A | 8/1986 | Sakashita et al. | |
| 4,831,106 A | 5/1989 | Kempter et al. | |
| 2016/0102202 A1* | 4/2016 | Lamberts ............... | C08L 77/06 524/413 |
| 2016/0168381 A1 | 6/2016 | Washio et al. | |

FOREIGN PATENT DOCUMENTS

| | | |
|---|---|---|
| CN | 101412845 A | 4/2009 |
| DE | 1 495 393 A | 4/1969 |
| DE | 195 13 940 A1 | 1/1996 |
| EP | 0 129 195 A2 | 12/1984 |
| EP | 0 129 196 A2 | 12/1984 |
| EP | 0 299 444 A2 | 1/1989 |
| EP | 0 976 774 A2 | 2/2000 |
| EP | 1 788 027 A1 | 5/2007 |
| EP | 3 006 506 A1 | 4/2016 |
| EP | 3 026 084 A1 | 6/2016 |
| JP | 2000-38505 A | 2/2000 |
| JP | 2008-179753 A | 8/2008 |
| WO | 2007/139987 A1 | 12/2007 |
| WO | 2015/011935 A1 | 1/2015 |

OTHER PUBLICATIONS

International Search Report for PCT/EP2017/067241 dated Oct. 11, 2017 [PCT/ISA/210].
H. Heißler, "Verstärkte Kunststoffe in der Luft- und Raumfahrt", [Reinforced plastics in aerospace], Verlag W. Kohlhammer, Stuttgart, 1986, pp. 95-128, 36 pages.
Written Opinion for PCT/EP2017/067241 dated Oct. 11, 2017.

* cited by examiner

*Primary Examiner* — Ana L. Woodward
(74) *Attorney, Agent, or Firm* — Sughrue Mion, PLLC

(57) ABSTRACT

The invention relates to a polyamide moulding compound consisting of the following components: (A) 35-68 wt. % of at least one semi-crystalline, semi-aromatic, thermoplastic polyamide based on aliphatic diamines with 4-8 carbon atoms with a melting temperature of at least 270° C.; (B) 15-22 wt. % carbon fibres; (C) 18-30 wt. % glass fibres; (D) 1-10 wt. % of an impact-resistance modifier that is different from (E) and/or polymers that are different from (A), (E) and (F); (E) 0-10 wt. % ethylene-vinyl acetate copolymer; and (F) 0-3 wt. % additives. In this way, the sum of the components (A)-(F) is 100 wt. %, the sum of the components (B)-(C) is in the range of 33-48 wt. %, and the sum of the components (D)-(E) is in the range of 2-12 wt. %. The moulding compound permits the production of dimensionally stable, electrically conductive components, e.g. for the automotive sector and for contact with fuels, in particular methanol-containing petrol.

36 Claims, No Drawings

CONDUCTIVE THERMOPLASTIC POLYAMIDE MOLDING COMPOUND

CROSS REFERENCE TO RELATED APPLICATIONS

This application is a National Stage of International Application No. PCT/EP2017/067241 filed Jul. 10, 2017, claiming priority based on European Patent Application No. 16 179 233.8 filed Jul. 13, 2016.

TECHNICAL FIELD

The present invention relates to conductive thermoplastic polyamide molding compositions, more particularly based on semicrystalline semiaromatic polyamides, and also to moldings produced from them and to the use of such polyamide molding compositions for applications, for example, in the automobile sector, especially in connection with the supply of fuel and in contact with fuels.

PRIOR ART

Plastics, including polyamides among others, are established as high-grade materials in sectors including that, for example, of automobiles. Semiaromatic polyamides in particular feature good mechanical properties, even at high temperatures, like those which are present in modern engines, and feature high resistance toward chemicals, including, in particular, fuels, coolants, etc.

WO-A-2007139987 discloses thermoplastics with hybrid reinforcement in which consistently more than 50 wt % of the molding composition is formed by glass fibers and carbon fibers, the ratio of glass fibers to carbon fibers being in the range from 13:1 to 1:1. Among the molding compositions operated employed in the examples are compositions based on polyamides. The highly filled molding compositions are problematic in their processing and have a poor surface quality.

Molding compositions which are likewise highly stiff and tough are described by EP-A-1 788 027. Here, the polymer matrix consists of a blend of PA66 and PA 6T/6I, with the aliphatic polyamide forming the main component. The molding compositions are reinforced with a mixture of glass fibers and carbon fibers, the mixing ratio being in the range from 80:20 to 95:5. Owing to the predominantly aliphatic matrix, therefore, the heat deflection temperature (HDT C according to ISO 75) is at a low level.

EP-A-3 006 506 relates to high-melting polyamides whose fluidity is modified by means of ethylene-vinyl acetate copolymers. It operates with semiaromatic polyamides 6T/66 and 6T/6I, which are reinforced with glass fibers and include impact modifiers as further additives. Combinations of glass fibers and carbon fibers are neither used nor described as a preferred embodiment. Moreover, no gasoline contact applications are identified.

WO-A-2015/011935, also as EP-A-3 026 084 in English, relates to molding compositions based on semiaromatic polyamides for use in sectors including that of fuel supply of automobiles. The molding compositions are glass fiber-reinforced and impact modified, and may, furthermore, include conductive additives as well, such as carbon black, carbon nanotubes or carbon fibers, for example. The molding composition rendered electrically conductive with carbon fibers in the example does originally have sufficient conductivity, but loses this on storage in gasoline, especially in methanol-containing gasoline. Critical contributors to this are the low glass fiber fraction and the not inconsiderable addition of amorphous polyamide.

JP-A-2008179753 describes fiber-reinforced polyphthalamide molding compositions for use in the automobile sector, particularly in contact with fuels. The preferred polyphthalamides, and those used in the examples, are based on relatively long-chain diamines, more particularly C9 diamines, and in the electrically conductive molding compositions contain only low glass fiber fractions of at most 10 wt %, if carbon fibers are used at the same time. In contact with gasoline, especially methanol-containing gasoline, however, there is a rapid increase in the electrical resistance of such molding compositions, and so after just a short time the conductivity is inadequate.

JP-A-2000038505 describes electrically conductive polyphthalamide molding compositions for use in the automobile sector. Components produced from these molding compositions are said to be resistant to calcium chloride and also to have good electrical conductivity and weldability. The mandatory presence of conductive carbon black, however, leads to a drastic reduction in the elongation at break and in the impact toughness.

SUMMARY OF THE INVENTION

It is an object of the present invention, accordingly, to provide a dimensionally stable, readily processable and also, preferably, highly flowable material with as far as possible a durable electrical conductivity and preferably a good surface for applications, for example, in fuel supply (especially, for example, quick connectors for fuel lines), more particularly in contact with methanol-containing gasoline. This material ought to be based on semiaromatic, semicrystalline polyamides that are themselves based on readily available and processable, short-chain aliphatic diamines, of which the processing is known and of which the product properties are established and widespread. These polyamides have excellent thermomechanical properties and are inexpensive to produce.

PA6 and PA66 have inadequate resistance to calcium chloride and are therefore out of the question as a base polymer for such applications. Polyphthalamide materials with conductive carbon black are costly and inconvenient to produce and exhibit inadequate elongation at break. Polyphthalamide materials with long-chain aliphatic diamine units do have some advantageous properties, but the long-chain diamine units are difficult to get hold of, have not very well-known processing, and have product properties which, leaving aside specialty applications, are not established and widespread. Moreover, high production costs result for these polyamides. Carbon nanotubes, as an addition to such polyamides for these kinds of application, likewise result in low conductivity and poor mechanical properties. Materials rendered conductive using carbon fibers alone lose their initial conductivity on storage in methanol-containing gasoline at 60° C. within 100 h. The requirement, however, after 5000 h (methanol-containing gasoline, especially CM15, 60° C.) is for a surface resistance of less than or equal to 1 E+6 ohms (i.e., $1\times10^6$ ohms), to allow electrostatic charging of the fuel-carrying parts to be reliably avoided over the entire lifetime.

References here to methanol-containing fuel or methanol-containing gasoline are understood as meaning a fuel for motor vehicles that among other fuel constituents includes at least 5 vol % (percent by volume), preferably at least 7 vol %, and especially preferably at least 10 vol % of methanol. Surprisingly it has now been found that improved properties are achieved and in particular the stated requirements are met by a polyamide molding composition according to claim 1, as for example a corresponding PA 6T/66 or 6T/6I as components (A), which at the same time comprises carbon fibers (B) and glass fibers (C) in a narrow concentration range. Through the presence of glass fibers it is possible to hold the carbon fiber concentration below 20%. In one preferred embodiment, a combination of impact modifier and, optionally, ethylene-vinyl acetate copolymer as well ensure not only better toughness in conjunction with improved processing qualities (flow length, preferably demoldability as well) and surface quality, but also a more consistent retention of the conductivity in contact with gasoline, especially methanol-containing gasoline (e.g., CM15, which as well as 42.5 vol % of isooctane and 42.5 vol % of toluene contains 15 vol % of methanol).

The present invention relates specifically to a polyamide molding composition consisting of the following components:
(A) 35-68 wt % of at least one semicrystalline, semiaromatic, thermoplastic polyamide having a melting temperature (Tm) of at least 270° C., measured according to ISO standard 11357-3 (2011-05) on pelletized material with a heating rate of 20° C./min, based on terephthalic acid and primarily on a short-chain aliphatic diamine having not more than 8 carbon atoms;
(B) 13-22 wt % of carbon fibers;
(C) 18-30 wt % of glass fibers;
(D) 1-10 wt % of impact modifier different from (E) and/or polymers different from (A), (E), and (F);
(E) 0-10 wt % of ethylene-vinyl acetate copolymer;
(F) 0-3 wt % of additives.

The sum of components (A)-(F) here is 100 percent by weight; in other words, apart from components (A)-(F), there are no further constituents present in the molding composition.

Additionally, the sum of (B)-(C), i.e., the fraction of fibrous adjuvants, is in the range from 33 to 48 wt %. The sum of (D)-(E), the further adjuvants besides the additives and the fibrous adjuvants, is in the range from 1 to 12 wt %.

As indicated, the advantageous effects come about only if the claimed proportions are observed. If lower or higher fractions of carbon fibers are used, it is impossible in particular to realize the sustained conductivity; if the glass fiber fractions and the fractions of components (D) and (E) are not observed, there is detriment to the mechanical properties in particular, as well as the sustained conductivity. The fractions of carbon fibers and glass fibers and also of the further adjuvants have surprisingly strong correlation with regard to the properties, especially the sustained conductivity and the mechanical properties in an overview.

For the various components, in accordance with preferred embodiments, the following narrower ranges prove to be advantageous, and may be selected individually in these preferred ranges or in a combination of the ranges:
the fraction of component (A) may advantageously be in the range of 40-62.9 wt %, preferably in the range of 50-58.8 wt %.

The fraction of component (B), the carbon fibers, is preferentially in the range of 14-20 wt %, preferably in the range of 15-18 wt %.

The fraction of component (C), the glass fibers, is preferably in the range of 20-28 wt %, more preferably in the range of 20-25 wt %.

The fraction of component (D) is preferably in the range of 2-8 wt %, more preferably in the range of 3-6 wt %.

The fraction of component (E) is preferentially in the range of 1-8 wt %, preferably in the range of 2-7 or 2-6 wt %.

The fraction of component (F) is preferentially in the range of 0.1-2.0 wt %, preferably in the range of 0.2-1.5 wt %.

Particularly preferred, for example, are molding compositions wherein the fractions are as follows:
(A) in the range of 40-63.9 wt %, (B) in the range of 14-20 wt %, (C) in the range of 20-28 wt %, (D) in the range of 2-8 wt %, (E) in the range of 0-8 wt %, and (F) in the range of 0.1-2.0 wt %.
(A) in the range of 50-58.8 wt %, (B) in the range of 15-18 wt %, (C) in the range of 20-25 wt %, (D) in the range of 3-6 wt %, (E) in the range of 2-7 wt %, and (F) in the range of 0.2-1.5 wt %.

It is further preferable if the sum of components (B)-(C) is in the range of 34-45 wt %, preferably in the range of 35-40 wt %.

According to a further preferred embodiment, the sum of components (D)-(E) is in the range of 2-10 wt %, preferably in the range of 3-9 or 4-9 wt %.

Component (A):
Present as component (A) in the polyamide molding composition is 35-68, preferably 40-62.9 wt % of at least one thermoplastic, semiaromatic polyamide, constructed on the basis of terephthalic acid and, primarily, a short-chain aliphatic diamine having at most 8 carbon atoms. Other aliphatic diamines, having more than 8 carbon atoms, are not among the building blocks.

Summarized generally, component (A) is designed preferentially as follows:

A first preferred embodiment is characterized in that component (A) is a polyamide or a mixture of polyamides having a melting temperature ($T_m$), measured according to ISO standard 11357-3 (2011-05) on pelletized material with a heating rate of 20° C./min, in the range from 280° C. to 340° C., preferably in the range from 285° C. to 330° C. Preferably, when a mixture is present as component (A), not only the mixture but also each of the individual components within (A) has such a melting temperature.

A further preferred embodiment is characterized in that the enthalpy of fusion of component (A) is in the range from 30 to 70 J/g, more particularly 40 to 65 J/g, where preferably, when a mixture is present as component (A), not only the mixture but also each of the individual components within (A) has such an enthalpy of fusion.

A further preferred embodiment is characterized in that component (A) has a solution viscosity, measured according to ISO 307 (2013-08) in m-cresol (0.5 wt %, 20° C.), of $\eta_{rel}$ less than 2.6, preferably of $\eta_{rel}$ less than 2.3, more particularly of $\eta_{rel}$ less than 2.0, and more particularly of $\eta_{rel}$ at least 1.55, where preferably, when a mixture is present as component (A), not only the mixture but also each of the individual components within (A) has such a solution viscosity.

The invention is characterized in that the polyamide or the polyamides of component (A) is composed of:
(A1) 25-100 mol %, preferably 40-100 mol %, especially preferably 50-80 mol %, of terephthalic acid, based on the total amount of dicarboxylic acids present,
0-75 mol %, preferably 0-60 mol %, especially preferably 20-50 mol %, based on the total amount of dicarboxylic acids present, of at least one dicarboxylic acid selected from the following group: non-terephthalic acid aromatic dicarboxylic acid having 8 to 20 carbon atoms, aliphatic dicarboxylic acid having 6 to 36 carbon atoms, cycloaliphatic dicarboxylic acid having 8 to 20 carbon atoms, or a mixture thereof, (A2) 50-100 mol %, preferably 80-100 mol %, based on the total amount of diamines present, of at least one aliphatic diamine having 4-8, preferably having 6 carbon atoms, 0-50 mol %, preferably 0-20 mol %, based on the total amount of diamines present, of at least one diamine selected from the following group: cycloaliphatic diamine having 6 to 20 carbon atoms, araliphatic diamine having 8 to 20 carbons, where the percentage molar content of dicarboxylic acids is 100 mol % and the percentage molar content of diamines is 100 mol %, and also of:

(A3) 0-100 mol % of aminocarboxylic acids and/or lactams having 4 to 36 carbon atoms, preferably having 6 to 12 carbon atoms, with the proviso that the concentration of (A3) is at most 40 wt %, preferably at most 30 wt %, more particularly at most 20 wt %, based on the sum of (A1) to (A3).

Particular preference is given to systems for the polyamide or the polyamides of component (A), preferentially when component (A) is formed substantially only by a semicrystalline, semiaromatic polyamide, which are composed of:

(A1) 50-80 mol % or 100 mol %, of terephthalic acid, based on the total amount of dicarboxylic acids present, 0 or 20-50 mol %, based on the total amount of dicarboxylic acids present, of at least one dicarboxylic acid selected from the following group:

non-terephthalic acid aromatic dicarboxylic acid having 8 to 20 carbon atoms, preferably isophthalic acid, aliphatic dicarboxylic acid having 6 to 36 carbon atoms, preferably having 6 carbon atoms, cycloaliphatic dicarboxylic acid having 8 to 20 carbon atoms, or a mixture thereof, (A2) 50-100 mol %, preferably 80-100 mol %, based on the total amount of diamines present, of at least one aliphatic diamine having 4 to 8, preferably having 6 carbon atoms, 0-50 mol %, preferably 0-20 mol %, based on the total amount of diamines present, of at least one diamine selected from the following group: cycloaliphatic diamine having 6 to 20 carbon atoms, araliphatic diamine having 8 to 20 carbons, where the percentage molar content of dicarboxylic acids is 100 mol % and the percentage molar content of diamines is 100 mol %, and also, optionally, of:

(A3) 0-100 mol % of aminocarboxylic acids and/or lactams having 4 to 36 carbon atoms, preferably having 6 to 12 carbon atoms, with the proviso that the concentration of (A3) is at most 40 wt %, preferably at most 30 wt %, more particularly at most 20 wt %, based on the sum of (A1) to (A3).

Preferred in this context are systems of type 6T/66 (with block proportions as follows: 6T in the range of 50-70 mol % and 66 in the range of 30-50 mol %) and/or of type 6T/6I (with block proportions as follows: 6T in the range of 50-80 mol %, preferably in the range of 60-75 mol %, 6I in the range of 20-50, preferably in the range of 25-40 mol %) and/or of type 6T/MPDT (with block proportions as follows: 6T in the range of 40-60 mol % and MPDT in the range of 40-60 mol %, MPD=2-methylpentanediamine).

A further preferred embodiment is characterized in that the polyamide or the polyamides of component (A) are specifically selected from the following group: PA 4T/46, PA 4T/66, PA 4T/4I, PA 4T/4I/46, PA 4T/46/66, PA 4T/4I/66, PA 4T/56, PA 5T/56, PA 5T/5I, PA 5T/66, PA 6T/6I, PA 6T/66, PA 6T/612, PA 6T/12, PA 6T/11, PA 6T/6, PA 6T/MACM10, PA 6T/MACM12, PA 6T/MACM18, PA 6T/MACMI, PA MACMT/6I, PA 6T/PACM6, PA 6T/PACM10, PA 6T/PACM12, PA 6T/PACM18, PA 6T/PACMI, PACMT/6I, PA MPDT/MPDI, PA MPDT/MPD6, PA 6T/MPDI, PA 6T/MPDT (MPD=2-methylpentanediamine), PA 6T/6I/66, PA 6T/6I/6, PA 6T/6I/12, PA 6T/66/6, PA 6T/66/12, PA 6T/6I/MACMI, PA 6T/66/PACM6, or a mixture of such systems. Selection is preferably as PA 6T/6I, PA 6T/66, or a mixture of such systems.

The fraction of terephthalic acid in component (A) is preferably in the region of at least 50 mol %, preferably at least 52 mol %, especially preferably at least 54 mol %, and very preferably at least 62 mol %, with terephthalic acid preferably accounting for up to 100% or up to 99 mol %, 95 mol %, or 90 mol %.

A further preferred embodiment is characterized in that component (A) is formed by at least one semicrystalline polyamide 6T/6I having 50 to 80 mol % of hexamethyleneterephthalamide units and 20 to 50 mol % of hexamethyleneisophthalamide units, preferably having 55 to 75 mol % of hexamethyleneterephthalamide units and 25 to 45 mol % of hexamethyleneisophthalamide units, especially preferably having 62 to 73 mol % of hexamethyleneterephthalamide units and 25 to 38 mol % of hexamethyleneisophthalamide units.

A further preferred embodiment is characterized in that component (A) is formed by at least one semicrystalline polyamide 6T/66 having 50 to 80 mol % of hexamethyleneterephthalamide units and 20 to 50 mol % of hexamethyleneadipamide units, preferably having 52 to 68 mol % of hexamethyleneterephthalamide units and 32 to mol % of hexamethyleneadipamide units, especially preferably having 55 to 65 mol % of hexamethyleneterephthalamide units and 35 to 45 mol % of hexamethyleneadipamide.

Component (A) may further be formed by at least one semicrystalline ternary polyamide 6T/6I/66 having 50 to 70 mol % of hexamethyleneterephthalamide, 5 to 45 mol % of hexamethyleneisophthalamide units, and 5 to 45 mol % of hexamethyleneadipamide units, more particularly having 62 to 68 mol % of hexamethyleneterephthalamide, 20 to 30 mol % of hexamethyleneisophthalamide units, and 5 to 15 mol % of hexamethyleneadipamide units.

Component (A) may also be formed, furthermore, by at least one 6T/6I/X having at least 50 mol % of hexamethyleneterephthalamide, 0 to 40 mol % of hexamethyleneisophthalamide, and 10 to 50 mol % of aliphatic units of the formula —NH—(CH2)n-1-CO—, where n is 6, 11 or 12, or by a 6T/6I/X having at least 50 mol % of hexamethyleneterephthalamide, 10 to 30 mol % of hexamethyleneisophthalamide and 10 to 40 mol % of aliphatic units of the formula —NH—(CH2)n-1-CO—, where n is 6, 11 or 12, or by a 6T/6I/X having 52 to 73 mol % of hexamethyleneterephthalamide, 0 to 36 mol % of hexamethyleneisophthalamide, and 12 to 48 mol % of aliphatic units of the formula —NH—(CH2)n-1-CO—, where n is 6, 11 or 12, or by a 6T/6I/X having 52 to 73 mol % of hexamethyleneterephthalamide and 10 to 36 mol % of hexamethyleneisophthalamide units, 12 to 38 mol % of aliphatic units of the formula —NH—(CH2)n-1-CO—, where n is 6, 11 or 12.

Now looked at specifically, component (A) may alternatively or additionally be further generally characterized as follows, in accordance with one or more of the following further preferred embodiments:

Preferentially, then, component (A) is based on a polyphthalamide. Polyphthalamides are polyamides based on terephthalic acid and aliphatic or cycloaliphatic diamines, and optionally further aliphatic, cycloaliphatic or aromatic dicarboxylic acids, and also lactams and/or aminocarboxylic acids.

Suitable generally as high-melting polyamide is a polyamide based on aromatic dicarboxylic acids and short-chain aliphatic diamines. A portion of the aromatic dicarboxylic acids may be replaced by aliphatic and/or cycloaliphatic dicarboxylic acids; a portion of the short-chain aliphatic diamines may be replaced by cycloaliphatic and/or araliphatic diamines. Partial replacement of the dicarboxylic acids and of the diamines may also take place by lactams and/or aminocarboxylic acids.

Accordingly, the high-melting polyamides of component (A) are preferentially formed from the following components:

(A1) Dicarboxylic Acids:
50-100 mol % of terephthalic acid, based on the total amount of acids present,
0-50 mol %, based on the total amount of acids present, of another aromatic dicarboxylic acid having 8 to 20 carbon atoms, and/or of an aliphatic dicarboxylic acid having 6 to 36 carbon atoms, and/or of a cycloaliphatic dicarboxylic acid having 8 to 20 carbon atoms, or of a mixture of such systems (A2) Diamines:
50-100 mol % of at least one aliphatic diamine having 4 to 8 carbon atoms, based on the total amount of diamines present,
0-50 mol % of cycloaliphatic diamines having 6 to 20 carbon atoms, and/or araliphatic diamines having 8 to 20 carbons, such as MXDA and PXDA, for example, or of a mixture of such cycloaliphatic or araliphatic systems, where, in the high-melting polyamides, the percentage molar amount of dicarboxylic acids is 100% and the percentage molar amount of diamines is 100%, and, optionally, from:

(A3) aminocarboxylic acids and/or lactams, comprising 0-100 mol % of lactams having 6 to 12 carbon atoms, and/or aminocarboxylic acids having 6 to 12 carbon atoms.

Whereas components (A1) and (A2) are used largely equimolarly, the concentration of (A3) is in each case preferably at most 40 wt %, preferably at most 30 wt %, more particularly at most 20 wt %, based on the sum of (A1) to (A3).

In addition to the components (A1) and (A2) used largely equimolarly, dicarboxylic acids (A1) or diamines (A2) may be used to regulate the molar mass or to compensate monomer losses during polyamide production, and so in its entirety the concentration of a component A1 or A2 may predominate.

A portion of the terephthalic acid (TEA), specifically up to 50 mol %, preferably up to 48 mol %, and more particularly up to 46 mol %, may be replaced by other aromatic, aliphatic or cycloaliphatic dicarboxylic acids having 6 to 36 carbon atoms (based on the total amount of the dicarboxylic acids).

The suitable aromatic dicarboxylic acids include naphthalenedicarboxylic acid (NDA) and isophthalic acid (IPA).

Suitable aliphatic dicarboxylic acids are adipic acid, suberic acid, azelaic acid, sebacic acid, undecanedioic acid, dodecanedioic acid, brassylic acid, tetradecanedioic acid, pentadecanedioic acid, hexadecanedioic acid, octadecanedioic acid, and dimer fatty acid (C36). Suitable cycloaliphatic dicarboxylic acids are the cis- and/or trans-cyclohexane-1,4-dicarboxylic acid and/or cis- and/or trans-cyclohexane-1,3-dicarboxylic acid (CHDA).

The diamines used at 50-100 mol % as component A2 are preferentially selected from the group of 1,4-butanediamine, 1,5-pentanediamine, 1,6-hexanediamine, 2-methyl-1,5-pentanediamine (MPD), 1,7-heptanediamine, 1,8-octanediamine. Preference of these is given to the diamines 1,6-hexanediamine, 2-methyl-1,5-pentanediamine, and 1,8-octanediamine, especially 1,6-hexanediamine and methyl-1,5-pentanediamine.

The above-stated short-chain aliphatic diamines may be replaced in a minor amount, meaning specifically not more than 50 mol %, preferably not more than 40 mol %, and more particularly not more than 30 mol %, based in each case on the total amount of the diamines) by other diamines.

Cycloaliphatic diamines used may preferably be cyclohexanediamine, 1,3-bis(aminomethyl)cyclohexane (BAC), isophoronediamine, norbornanedimethylamine, 4,4'-diaminodicyclohexylmethane (PACM), 2,2-(4,4'-diaminodicyclohexyl)propane (PACP), bis(4-amino-3-ethylcyclohexyl)methane (EACM), bis(4-amino-3,5-dimethylcyclohexyl)methane (TMDC), and 3,3'-dimethyl-4,4'-diaminodicyclohexylmethane (MACM).

Araliphatic diamines used may preferably be m-xylylenediamine (MXDA) and p-xylylenediamine (PXDA).

In addition to the dicarboxylic acids and diamines described, it is also possible to use lactams and/or aminocarboxylic acids as polyamide-forming components (component A3) to a certain, limited extent. Suitable compounds are preferably caprolactam (CL), α, ω-aminocaproic acid, α, ω-aminononanoic acid, α, ω-aminoundecanoic acid (AUA), laurolactam (LL), and α, ω-aminododecanoic acid (ADA). The concentration of the aminocarboxylic acids and/or lactams used together with components (A1) and (A2) in this case, however, is at most 40 wt %, preferably at most 30 wt %, and more preferably at most 20 wt %, based on the sum of components (A1) and (A2).

Especially preferred lactams are lactams or α, ω-amino acids having 4, 6, 7, 8, 11 or 12 carbons. These are, for example, the lactams pyrrolidin-2-one (4 carbons), ε-caprolactam (6 carbons), enantholactam (7 carbons), caprylolactam (8 carbons), laurolactam (12 carbons), and the α, ω-amino acids 1,4-aminobutanoic acid, 1,6-aminohexanoic acid, 1,7-aminoheptanoic acid, 1,8-aminooctanoic acid, 1,11-aminoundecanoic acid, and 1,12-aminododecanoic acid.

Since diamines are more volatile compounds than dicarboxylic acids, the production process is typically accompanied by a loss of diamines. To compensate the loss of diamine, therefore, the monomer batch is preferably admixed with a diamine excess of 1 to 8 wt %, based on the total amount of the diamines. The diamine excess also regulates the molecular weight and the distribution of the end groups.

To regulate the molar mass, the relative viscosity and/or the fluidity or the MVR, it is possible for the batch and/or the precondensate (before the postcondensation) to be admixed with chain transfer agents in the form of monocarboxylic acids or monoamines. Aliphatic, cycloaliphatic or aromatic monocarboxylic acids or monoamines suitable as chain transfer agents are acetic acid, propionic acid, butyric acid, valeric acid, caproic acid, lauric acid, stearic acid, 2-ethylhexanoic acid, cyclohexanoic acid, benzoic acid, butylamine, pentylamine, hexylamine, 2-ethylhexylamine, n-octylamine, n-dodecylamine, n-tetradecylamine, n-hexadecylamine, stearylamine, cyclohexylamine, 3-(cyclohexylamino)propylamine, methylcyclohexylamine, dimethylcyclohexylamine, benzylamine, 2-phenylethylamine, etc. The chain transfer agents may be utilized individually or in combination. It is also possible for the chain transfer agents used to comprise other monofunctional compounds which are able to react with an amino group or acid group, such as anhydrides, isocyanates, acyl halides, or esters. The preferred amount in which the chain transfer agents used is between 10 and 200 mmol per kg of polymer.

The semiaromatic copolyamides (A) may be prepared by methods which are known per se. Suitable methods have been described in various places, and a number of the possible methods will be indicated hereinafter; the disclosure content of the patent documents identified below is expressly included in the disclosure content of the present application insofar as it relates to the method for preparing the copolyamide of component A of the present invention: DE 195 13 940, EP 0 976 774, EP 0 129 195, EP 0 129 196, EP 0 299 444, U.S. Pat. Nos. 4,831,106, 4,607,073, DE 14 95 393, and U.S. Pat. No. 3,454,536.

Suitable for preparing component (A) is preferably the two-stage preparation first of a low-viscosity, low molecular mass precondensate, and with subsequent postcondensation in the solid phase or the melt (e.g., in an extruder).

Also possible is a three-stage method comprising 1. precondensation, 2. solid-phase polymerization, and 3. melt polymerization, as indicated for example in DE 696 30 260, whose disclosure content in this respect is likewise included.

For products having melting points below 300° C., another suitable method is the one-stage batch method described in U.S. Pat. Nos. 3,843,611 and 3,839,296 and in this respect likewise included, in which the mixture of the monomers or salts thereof are heated at temperatures of 250 to 320° C. for 1 to 16 hours and the pressure is reduced from a maximum, with evaporation of gaseous material, optionally with the aid of an inert gas, to the lowest pressure of down to 1 mm Hg.

Formulated generally, therefore, a preferred embodiment of the polyamide molding composition in relation to component (A1) is characterized in that the non-terephthalic acid dicarboxylic acid of component (A1) is selected from the following group: naphthalenedicarboxylic acid, isophthalic acid, adipic acid, suberic acid, azelaic acid, sebacic acid, undecanedioic acid, dodecanedioic acid, brassylic acid, tetradecanedioic acid, pentadecanedioic acid, hexadecanedioic acid, octadecanedioic acid, dimer fatty acid (C36), cis- and/or trans-cyclohexane-1,4-dicarboxylic acid, cis- and/or trans-cyclohexane-1,3-dicarboxylic acid, or mixtures thereof.

A preferred embodiment of the polyamide molding composition in relation to component (A2) is characterized in that the aliphatic diamine of component (A2) is selected from the following group: 1,4-butanediamine, 1,5-pentanediamine, 1,6-hexanediamine, 2-methyl-1,5-pentanediamine, 1,7-heptanediamine, 1,8-octanediamine, or a mixture thereof, preference being given to the following group: 1,6-hexanediamine, 2-methyl-1,5-pentanediamine, or a mixture thereof.

A further preferred embodiment of the polyamide molding composition in respect of component (A2) is characterized in that the cycloaliphatic or araliphatic diamine of component (A2) is selected from the following group: cyclohexanediamine, 1,3-bis(aminomethyl)cyclohexane, isophoronediamine, norbornanedimethylamine, 4,4'-diaminodicyclohexylmethane, 2,2-(4,4'-diaminodicyclohexyl)propane and 3,3'-dimethyl-4,4'-diaminodicyclohexylmethane, m-xylylenediamine and p-xylylenediamine, or a mixture thereof.

A further preferred embodiment of the polyamide molding composition in respect of component (A3) is characterized in that component (A3) is selected from the following group: caprolactam, α, ω-aminocaproic acid, α, ω-aminononanoic acid, α, ω-aminoundecanoic acid, laurolactam, α, ω-aminododecanoic acid, α, ω-amino acids having 4, 6, 7, 8, 11 or 12 carbons, more particularly pyrrolidin-2-one, ε-caprolactam, enantholactam, caprylolactam, laurolactam, 1,4-aminobutanoic acid, 1,6-aminohexanoic acid, 1,7-aminoheptanoic acid, 1,8-aminooctanoic acid, 1,11-aminoundecanoic acid, and 1,12-aminododecanoic acid, or a mixture thereof.

Specific representatives of the semiaromatic polyamides of the invention are the following systems already specified above, or mixtures (blends) thereof: PA 4T/46, PA 4T/66, PA 4T/4I, PA 4T/4I/46, PA 4T/46/66, PA 4T/4I/66, PA 4T/56, PA 5T/56, PA 5T/5I, PA 5T/66, PA 6T/6I, PA 6T/66, PA 6T/610, PA 6T/612, PA 6T/12, PA 6T/11, PA 6T/6, PA 6T/MACM10, PA 6T/MACM12, PA 6T/MACM18, PA 6T/MACMI, PA MACMT/6I, PA 6T/PACM6, PA 6T/PACM10, PA 6T/PACM12, PA 6T/PACM18, PA 6T/PACMI, PACMT/6I, PA MPDT/MPDI, PA MPDT/MPD6, PA 6T/MPDI, PA 6T/MPDT (MPD=2-methylpentanediamine), PA 6T/6I/66, PA 6T/6I/6, PA 6T/6I/12, PA 6T/66/6, PA 6T/66/12, PA 6T/6I/MACMI, PA 6T/66/PACM6.

According to one preferred embodiment, the fraction of terephthalic acid in component (A1) is at least 50 mol %, preferably at least 52 mol %, especially preferably at least 54 mol %, and very preferably at least 62 mol %, and preferentially component (A2) consists exclusively of hexamethylenediamine or exclusively of 2-methyl-1,5-pentanediamine or exclusively of a mixture of hexamethylenediamine and 2-methyl-1,5-pentanediamine.

In accordance with the invention, therefore, preferred high-melting polyamides (A) are more particularly the following semiaromatic copolyamides:

semicrystalline polyamide prepared from at least 50 mol % of terephthalic acid and hexamethylenediamine, as sole diamine component;

semicrystalline polyamide prepared from at least 52 mol % of terephthalic acid and hexamethylenediamine;

semicrystalline polyamide prepared from at least 54 mol % of terephthalic acid and hexamethylenediamine;

semicrystalline polyamide prepared from at least 62 mol % of terephthalic acid and hexamethylenediamine;

semicrystalline polyamide prepared from at least 60-70 mol % of terephthalic acid, 20-30 mol % of isophthalic acid, 5-15 mol % of adipic acid, and hexamethylenediamine;

semicrystalline polyamide prepared from at least 50 mol % of terephthalic acid and 2-methyl-1,5-pentanediamine;

semicrystalline polyamide prepared from at least 50 mol % of terephthalic acid and a mixture of hexamethylenediamine and 2-methyl-1,5-pentanediamine.

According to a further preferred embodiment, the fraction of terephthalic acid in component (A1) is at least 50 mol %, and within component (A2) the aliphatic diamine comprises hexamethylenediamine in a fraction of at least 10 mol %, preferably at least 15 mol %, and more preferably at least 50 mol %, and in that the remaining fraction of diamine is selected from the following aminocyclohexyl)methane, bis (4-amino-3-methylcyclohexyl)methane, or a mixture thereof, where preferably, from this group, only one system is used in a mixture with hexamethylenediamine.

In accordance with the invention, therefore, preferred high-melting polyamides (A) are, in particular additionally, the following semiaromatic copolyamides:

semicrystalline polyamide prepared from at least 50 mol % of terephthalic acid and a mixture of hexamethylenediamine and m-xylylenediamine, with at least 10 mol %, preferably at least 15 mol %, and more preferably at least 50 mol % of hexamethylenediamine being used, based on the total diamine content;

semicrystalline polyamide prepared from at least 50 mol % of terephthalic acid and a mixture of hexamethylenediamine and bis(4-aminocyclohexyl)methane, with at least 10 mol %, preferably at least 15 mol %, and more preferably at least 50 mol % of hexamethylenediamine being used, based on the total diamine content;

semicrystalline polyamide prepared from at least 50 mol % of terephthalic acid and a mixture of hexamethylenediamine and bis(4-amino-3-methylcyclohexyl)methane, with at least 10 mol %, preferably at least 15 mol %, and more preferably at least 50 mol % of hexamethylenediamine being used, based on the total diamine content.

A further preferred embodiment of the polyamide molding composition is characterized in that component (A) is formed by a semicrystalline polyamide 6T/6I having 50 to 80 mol % of hexamethyleneterephthalamide units and 20 to 50 mol % of hexamethyleneisophthalamide units, preferably having 55 to 75 mol % of hexamethyleneterephthalamide units and 25 to 45 mol % of hexamethyleneisophthalamide units, especially preferably having 62 to 73 mol % of hexamethyleneterephthalamide units and 25 to 38 mol % of hexamethyleneisophthalamide units.

In accordance with the invention, therefore, preferred high-melting polyamides (A), more particularly further, are the following semiaromatic copolyamides:

semicrystalline polyamide 6T/6I having 50 to 80 mol % of hexamethyleneterephthalamide units and 20 to 50 mol % of hexamethyleneisophthalamide units;

semicrystalline polyamide 6T/6I having 55 to 75 mol % of hexamethyleneterephthalamide units and 25 to 45 mol % of hexamethyleneisophthalamide units;

semicrystalline polyamide 6T/6I having 62 to 73 mol % of hexamethyleneterephthalamide units and 25 to 38 mol % of hexamethyleneisophthalamide units;

semicrystalline polyamide 6T/6I having 70 mol % of hexamethyleneterephthalamide units and 30 mol % of hexamethyleneisophthalamide units.

A further preferred embodiment of the polyamide molding composition is characterized in that component (A) is formed by a semicrystalline polyamide 6T/66 having 50 to 80 mol % of hexamethyleneterephthalamide units and 20 to 50 mol % of hexamethyleneadipamide units, preferably having 50 to 65 mol % of hexamethyleneterephthalamide units and 35 to 50 mol % of hexamethyleneadipamide units, especially preferably having 52 to 62 mol % of hexamethyleneterephthalamide units and 38 to 48 mol % of hexamethyleneadipamide.

In accordance with the invention, therefore, preferred high-melting polyamides (A), more particularly furthermore, are the following semiaromatic copolyamides:

semicrystalline polyamide 6T/66 having 50 to 80 mol % of hexamethyleneterephthalamide units and 20 to 50 mol % of hexamethyleneadipamide (66) units;

semicrystalline polyamide 6T/66 having 50 to 65 mol % of hexamethyleneterephthalamide units and 35 to 50 mol % of hexamethyleneadipamide (66) units;

semicrystalline polyamide 6T/66 having 52 to 62 mol % of hexamethyleneterephthalamide units and 38 to 48 mol % of hexamethyleneadipamide (66) units;

semicrystalline polyamide 6T/66 having 55 mol % of hexamethyleneterephthalamide units and 45 mol % of hexamethyleneadipamide (66) units.

In accordance with the invention, therefore, preferred high-melting polyamides (A), additionally in particular, are the following semiaromatic copolyamides:

semicrystalline polyamide 6T/MPDT having 35 to 65 mol % of hexamethyleneterephthalamide units and 65 to 35 mol % of 2-methyl-1,5-pentamethylene-terephthalamide (MPDT) units;

semicrystalline polyamide 6T/MPDT having 40 to 60 mol % of hexamethyleneterephthalamide units and 60 to 40 mol % of 2-methyl-1,5-pentamethylene-terephthalamide (MPDT) units;

semicrystalline polyamide 6T/MPDT having 45 to 55 mol % of hexamethyleneterephthalamide units and 55 to 45 mol % of 2-methyl-1,5-pentamethylene-terephthalamide (MPDT) units.

Component (A), according to a further preferred embodiment, may also be formed by a semicrystalline ternary polyamide.

Correspondingly, it is further preferred for component (A) to be formed by a semicrystalline ternary polyamide 6T/6I/66 having 50 to 70 mol % of hexamethyleneterephthalamide, 5 to 45 mol % of hexamethyleneisophthalamide units, and 5 to 45 mol % of hexamethyleneadipamide units.

It is likewise preferred for component (A) to be formed by a 6T/6I/X having at least 50 mol % of hexamethyleneterephthalamide units, 0 to 40 mol % of hexamethyleneisophthalamide units, and 10 to 50 mol % of aliphatic units of the formula —NH—(CH2)n-1-CO—, where n is 6, 11 or 12.

It is likewise preferred for component (A) to be formed by a 6T/6I/X having at least 50 mol % of hexamethyleneterephthalamide units, 10 to 30 mol % of hexamethyleneisophthalamide units, and 10 to 40 mol % of aliphatic units of the formula —NH—(CH2)n-1-CO—, where n is 6, 11 or 12.

It is likewise preferred for component (A) to be formed by a 6T/6I/X having 52 to 73 mol % of hexamethyleneterephthalamide units, 0 to 36 mol % of hexamethyleneisophthalamide units, and 12 to 48 mol % of aliphatic units of the formula —NH—(CH2)n-1-CO—, where n is 6, 11 or 12.

It is likewise preferred for component (A) to be formed by a 6T/6I/X having 52 to 73 mol % of hexamethyleneterephthalamide units, 10 to 36 mol % of hexamethyleneisophthalamide units, and 12 to 38 mol % of aliphatic units of the formula —NH—(CH2)n-1-CO—, where n is 6, 11 or 12.

According to a further preferred embodiment, component (A) is based on a semiaromatic and semicrystalline polyamide containing up to 26 mol % of aliphatic units preparable by condensation of dimerized fatty acids having up to 44 carbon atoms and an aliphatic or cycloaliphatic diamine, more particularly with hexamethylenediamine.

Component (B):

The carbon fiber of component (B) is present in the polyamide molding composition in a fraction of 13-22 wt %, preferably of 14 to 20 wt % or of 15 to 20 wt %, and especially preferably of 15 to 18 wt %.

Summarized generally, component (B) is preferentially formed as follows:

A first preferred embodiment is characterized in that component (B) takes the form of chopped fibers or of a chopped or continuous fiber bundle.

A further preferred embodiment is characterized in that the fibers of component (B) have a length of 0.1 to 50 mm, preferably of 1 to 12 mm, and/or a diameter of 5 to 40 μm, especially preferably of 5 to 10 μm.

A further preferred embodiment is characterized in that the fibers of component (B) are formed on the basis of PAN-, pitch- or cellulose-based fibers.

Moreover, the fibers of component (B) may be anisotropic.

The fibers of component (B) may take the form of carbon fiber bundles composed of several hundred to hundred thousand individual filaments, which have a diameter of 5 to 10 µm, a tensile strength of 1000 to 7000 MPa, and an elasticity modulus of 200 to 700 GPa.

Now looked at specifically, component (B) may be further generally characterized alternatively, or additionally, as follows, in accordance with one or more of the following further preferred embodiments: The carbon fibers of component (B) may be used as chopped fibers or as a continuous fiber bundle, with preference being given to the use of chopped carbon fibers having a length of 0.1 to 50 mm, preferably of 1 to 12 mm, and a diameter of 5 to 40 µm, especially preferably of 5 to 10 µm. As a basis for the carbon fibers it is possible to use PAN-, pitch- or cellulose-based fibers, such as cellulose acetate, for example; especially preferred are PAN fibers (PAN polyacrylonitrile). These starting materials are converted by pyrolysis (oxidation and carbonization) into carbon arranged in the manner of graphite. Anisotropic carbon fibers exhibit high strengths and stiffnesses in conjunction with low elongation at break in the axial direction.

Carbon fibers are commonly produced by exposing a suitable polymer fiber of polyacrylonitrile, pitch or rayon to alternating, controlled conditions of temperature and atmosphere. For example, carbon fibers can be produced by stabilization of PAN filaments or PAN fabrics in an oxidative atmosphere at 200 to 300° C. with subsequent carbonization in an inert atmosphere above 600° C. Processes of this kind are state of the art and are described, for example, in H. Heißler, "Verstärkte Kunststoffe in der Luft- und Raumfahrt" [Reinforced plastics in aerospace], W. Kohlhammer, Stuttgart, 1986.

Carbon fiber bundles consist of several hundreds to hundreds of thousands of carbon fibers, known as individual filaments, which have a diameter of 5 to 10 µm, a tensile strength of 1000 to 7000 MPa, and an elasticity modulus of 200 to 700 GPa. Commonly, 1000 to 24 000 individual filaments are assembled to form a multifilament yarn (continuous carbon fiber bundle, roving), which is wound up. Further processing to textile intermediates such as fabrics, braids or multiaxial laid scrims, for example, takes place on weaving machines, braiding machines or multiaxial knitting machines, or, in the sector of production of fiber-reinforced plastics, directly on prepreg lines, pultrusion lines or winding machines.

In the form of short chopped fibers, they can be admixed to polymers and processed to plastics components via extruder lines and injection molding lines.

To improve or actually enable the processing of carbon fibers, and also to bring about high compatibility with the plastics employed, the carbon fibers are provided on their surface with a size. A polyamide-compatible size is preferred. One such chopped carbon fiber, for example, is available commercially under the tradename Tenax E-HT C604 6MM from Toho Tenax Europe GmbH (DE). According to a further preferred embodiment, the carbon fiber of component (B) may be a recyclate carbon fiber.

Component (C):

Component (C) is present preferentially in a fraction of 20-28 wt %, especially preferably in the range of 20-25 wt %.

Summarized in general terms, component (C) is preferentially designed as follows:

The fibers of component (C) preferentially have a circular or noncircular cross-sectional area.

In the case of glass fibers with a noncircular cross-sectional area, preference is given to using those having a dimensional ratio of the principal cross-sectional axis to the secondary cross-sectional axis, perpendicular thereto, of more than 2, preferably of 2 to 8, more particularly of 2.5 to 5.

Further, in the case of glass fibers with a noncircular cross-sectional area, the length of the principal cross-sectional axis is preferably in the range from 6 to 40 µm, more particularly in the range from 15 to 30 µm, and the length of the secondary cross-sectional axis is preferably in the range from 3 to 20 µm, more particularly in the range from 4 to 10 µm.

These so-called flat glass fibers having a noncircular cross-sectional area have, for example, a cross-sectional area which is oval, elliptical, elliptical with single or multiple necking (so-called cocoon fiber), polygonal, rectangular or nearly rectangular. A further characterizing feature of the flat glass fibers employed is that the flat glass fibers have an extremely high packing density, i.e., the extent to which the cross-sectional area of the glass fibers fills an imaginary rectangle surrounding the glass fiber cross section as precisely as possible is at least 70%, preferably at least 80%, and especially preferably at least 85%.

According to a further preferred embodiment, the fibers of component (C) are glass fibers which are substantially composed of or consist of the components silicon dioxide, calcium oxide, magnesium oxide, and aluminum oxide. In this case, preferably the $SiO_2/(CaO+MgO)$ weight ratio is less than 2.7, preferably less than 2.5, and more particularly between 2.1 and 2.4.

In particular, component (C) comprises an E-glass fiber according to ASTM D578-00.

In accordance with the invention, the glass fiber may also be a high-strength glass fiber. According to another preferred embodiment, the fibers of component (C) are glass fibers based on the ternary system of silicon dioxide-aluminum oxide-magnesium oxide or on the quaternary system of silicon dioxide-aluminum oxide-magnesium oxide-calcium oxide. Preferred in that case is a composition of 58-70 wt % of silicon dioxide ($SiO_2$), 15-30 wt % of aluminum oxide (Al2O3), 5-15 wt % of magnesium oxide (MgO), 0-10 wt % of calcium oxide (CaO), and 0-2 wt % of further oxides, more particularly zirconium dioxide (ZrO2), boron oxide (B2O3), titanium dioxide (TiO2) or lithium oxide (Li2O).

The high-strength glass fiber preferentially possesses a tensile strength of greater than or equal to 4000 MPa, and/or an elongation at break of at least 5% and a tensile modulus of elasticity of greater than 80 GPa. Specific examples of these high-strength glass fibers of the component are S-glass fibers from Owens Corning with 910 or 995 size, T-glass fibers from Nittobo, HiPertex from 3B, HS4-glass fibers from Sinoma Jinjing Fiberglass, R-glass fibers from Vetrotex, and also S-1- and S-2-glass fibers from AGY.

The fibers of component (C) may also be glass fibers having a circular cross section with a diameter in the range of 5-20 µm, preferably in the range of 6-17 µm, and more preferably in the range of 6-13 µm. They are employed preferably as short glass fiber (chopped glass having a length of 0.2 to 20 mm, preferably 2-12 mm).

The glass fibers of component (C) may generally be in the form of short fibers, preferably in the form of chopped glass with a length in the range of 0.2-20 mm or in the form of continuous filament fibers. Accordingly, the molding compositions comprise 18 to 30 wt %, preferably 20 to 30 wt %, and more preferably 20 to 25 wt % of a glass fiber (C) employed in the form of so-called short fibers (e.g., chopped glass with a length of 0.2-20 mm) or continuous filament fibers (rovings).

The stated glass fibers can be used individually or in a mixture of the various forms according to the preferred embodiments.

In order to reinforce the molding compositions of the invention it is therefore also possible, for example, to use mixtures of glass fibers having circular and noncircular cross sections, in which case the fraction of flat glass fibers is preferentially predominant, meaning that it accounts for more than 50 wt % of the overall mass of the fibers.

The glass fibers have preferentially been provided with a size suitable for the thermoplastic in question, more particularly for polyamide, this size comprising, for example, an adhesion promoter based on an aminosilane or epoxysilane compound.

The high-strength glass fibers employed as rovings within component (C) according to a further preferred embodiment preferably have a diameter of 8 to 20 μm, preferably of 12 to 18 μm, and the cross section of the glass fibers may be circular, oval, elliptical, elliptical with single or multiple necking, polygonal, rectangular or nearly rectangular. Particularly preferred are so-called flat glass fibers having a ratio of the cross-sectional axes of 2 to 5.

Continuous filament fibers, especially preferably within component (C), but similar comments preferably apply also or alternatively for component (B), are incorporated into the polyamide molding compositions of the invention by known methods for producing elongate long-fiber-reinforced pellets (fiber length and pellet length are identical), in particular by pultrusion methods wherein the continuous fiber strand (roving) is fully saturated with the polymer melt and then is cooled and chopped. The elongate long-fiber-reinforced pellets obtained in this way, which preferably have a pellet length of 3 to 25 mm, more particularly of 4 to mm, can be processed further with the usual processing techniques (e.g., injection molding, compression molding) to form molded parts. The molding compositions of the invention can also be reinforced by combining continuous fibers (long glass fibers) with chopped fibers (short glass fibers).

Component (D):

In a further embodiment, the molding composition of the invention comprises as component (D) up to 10 wt %, preferably 2 to 8 wt %, especially preferably 3 to 6 wt %, based on the overall molding composition, of one or more impact modifiers (IM) different from (A), (E), and (F), and/or polymers different from (A), (E), and (F).

Summarized in general terms, component (D) is preferentially designed as follows:

Component (D), where selected as impact modifier different from (A), (E), and (F), is preferentially selected from the following group: natural rubber, graft rubber, homopolymers or copolymers of olefins and/or styrenes and derivatives thereof and/or acrylates and derivatives thereof and/or anhydrides. Generally, the systems which form component (D) may be ungrafted or grafted. Component (D) in this case may more particularly be formed by (block) copolymers based on at least one or on a combination of the following building blocks or may comprise such systems: polybutadiene, polyisoprene, polyisobutylene, copolymer of butadiene and/or isoprene with styrene or styrene derivatives and other comonomers, hydrogenated copolymers and or copolymers formed by grafting or copolymerization with acid anhydrides, (meth)acrylic acid and esters thereof, styrene-based block copolymers, ethylene-α-olefin copolymers, ethylene-acrylate or ethylene-butylene-acrylate copolymers, ethylene, propylene, but-1-ene, including copolymers of olefins and copolymerizable monomers, such as especially (meth)acrylic esters and methylhexadiene. These systems may also take the form of an ionomer, in which the polymer-bonded carboxyl groups are connected to one another wholly or partly by metal ions.

Component (D), where selected as an impact modifier different from (A), (E), and (F), is preferentially selected as: copolymers, functionalized by grafting with maleic anhydride, of butadiene with styrene, apolar or polar olefin homopolymers and copolymers formed by grafting with maleic anhydride, and carboxylic acid-functionalized copolymers such as poly(ethene-co-(meth)acrylic acid) or poly(ethene-co-1-olefin-co-(meth)acrylic acid), in which the acid groups are partly neutralized with metal ions.

Component (D), where selected as a polymer different from (A), (E), and (F), is preferentially selected from the following group: aliphatic polyamide and polyolefin. Aliphatic polyamides are preferably selected from the group of PA 6, PA 46, PA 56, PA 66, PA 66/6, PA 69, PA 610, PA 612 and PA 614. Particularly preferred is PA 66 and PA 6. These aliphatic polyamides preferably have a solution viscosity, measured in m-cresol (0.5 wt %, 20° C., according to ISO 307), of in the range of 1.5 to 3.0, more particularly 1.6 to 2.7. Among the polyolefins, preference is given to polyethylene, more particularly LDPE, and polypropylene, and also ethylene-propylene copolymers. Certain additives, summarized in component (F), are not mixed in pure form with the other components when producing the molding compositions of the invention, but are instead mixed in the form of what are called concentrates or masterbatches (MB). The basis for these MBs are preferably the above-stated aliphatic polyamides or polyolefins of component (D), more particularly PA 6, PA 66, and LDPE. The fractions of the MB deriving from the aliphatic polyamides or polyolefins are therefore assigned to component (D). Consequently, only the pure fraction of the additive itself is ascribed to component (F).

Looked at now specifically, component (D) may alternatively or additionally be further generally characterized as follows, according to one or more of the following further preferred embodiments:

The impact modifier may be a natural rubber, polybutadiene, polyisoprene, polyisobutylene, a copolymer of butadiene and/or isoprene with styrene or styrene derivatives and other comonomers, a hydrogenated copolymer and or a copolymer formed by grafting or copolymerization with acid anhydrides, (meth)acrylic acid and esters thereof.

The impact modifier (D) may also be a graft rubber having a crosslinked elastomeric core which consists of butadiene, isoprene or alkyl acrylates and has a graft shell made of polystyrene, or may be an apolar or polar olefin homopolymer and copolymer such as ethylene-propylene rubber, ethylene-propylene-diene rubber, and ethylene-octene rubber, or an apolar or polar olefin homopolymer and copolymer formed by grafting or copolymerization with acid anhydrides, (meth)acrylic acid and esters thereof.

The impact modifier (D) may also be a carboxylic acid-functionalized copolymer such as poly(ethene-co-(meth)acrylic acid) or poly(ethene-co-1-olefin-co-(meth)acrylic acid), in which case the 1-olefin may be an alkene or an unsaturated (meth)acrylic ester having more than 4 atoms, including those copolymers in which the acid groups are partly neutralized with metal ions. Examples of the styrene-based block copolymers include styrene-(ethylene-butylene) diblock and styrene-(ethylene-butylene)-styrene triblock copolymers.

According to a further preferred embodiment, the molding compositions of the invention are characterized in that component (D) comprises a polyolefin homopolymer or an ethylene-α-olefin copolymer, especially preferably an EP and/or EPDM elastomer (ethylene-propylene rubber and, respectively, ethylene-propylene-diene rubber).

Hence component (D) may comprise, for example, an elastomer which is based on an ethylene-C3-12-α-olefin copolymer with 20 to 96, preferably 25 to 85, wt % of ethylene, the C3-12 α-olefin especially preferably being an olefin selected from the group of propene, 1-butene, 1-pentene, 1-hexene, 1-octene, 1-decene and/or 1-dodecene, and component (D) especially preferably being ethylene-propylene rubber and/or LLDPE and/or VLDPE.

Alternatively or additionally (in a mixture, for example), (D) may comprise a terpolymer based on ethylene-C3-12 α-olefin with an unconjugated diene, this terpolymer preferentially comprising 25 to 85 wt % of ethylene and up to a maximum in the range of 10 wt % of an unconjugated diene, with the C3-12 α-olefin especially preferably being an olefin selected from the group of propene, 1-butene, 1-pentene, 1-hexene, 1-octene, 1-decene and/or 1-dodecene, and/or with the unconjugated diene being preferably selected from the group of bicyclo[2.2.1]heptadiene, 1,4-hexadiene, dicyclopentadiene and/or, in particular, 5-ethylidenenorbornene.

Additionally suitable as a constituent for component (D), moreover, are ethylene-acrylate or ethylene-butylene-acrylate copolymers.

Component (D) preferentially possesses constituents having carboxylic acid groups or carboxylic anhydride groups, which are introduced by thermal or radical reaction of the main-chain polymer with an unsaturated dicarboxylic anhydride, an unsaturated dicarboxylic acid or an unsaturated dicarboxylic acid monoalkyl ester at a concentration sufficient for effective attachment to the polyamide, for which purpose reagents selected from the following group are preferentially employed: maleic acid, maleic anhydride, maleic acid monobutyl ester, fumaric acid, aconitic acid and/or itaconic anhydride.

Preferably 0.1 to 4.0 wt % of an unsaturated anhydride is grafted onto the impact modifier component as a constituent of (D), or the unsaturated dicarboxylic anhydride or precursor thereof is grafted together with a further unsaturated monomer. The degree of grafting, generally, is preferentially in a range of 0.1-1.0%, especially preferably in a range of 0.3-0.7%. Also possible as a constituent of component (D) is a mixture of an ethylene-propylene copolymer and an ethylene-butylene copolymer, having a maleic anhydride grafting degree (MAH grafting degree) in the range of 0.3-0.7%.

The possible systems indicated above for the component may also be used in mixtures.

The impact modifiers used as component (D) therefore include homopolymers or copolymers of olefins, such as ethylene, propylene, but-1-ene, for example, or copolymers of olefins and copolymerizable monomers, such as (meth) acrylic esters and methylhexadiene.

Examples of crystalline olefin polymers are low-density, medium-density, and high-density polyethylenes, polypropylene, polybutadiene, poly-4-methylpentene, random or block ethylene-propylene copolymers, ethylene-methylhexadiene copolymers, propylene-methylhexadiene copolymers, ethylene-propylene-butene copolymers, ethylene-propylene-hexene copolymers, ethylene-propylene-methylhexadiene copolymers, poly(ethylene-ethyl acrylate) (EEA), ethylene-octene copolymer, ethylene-butene copolymer, ethylene-hexene copolymer, ethylene-propylene-diene terpolymers, and combinations of the stated polymers.

Examples of commercially available impact modifiers which can be employed for the purposes of the constituents of component (D) are: TAFMER MC201: g-MAH (~0.6%) blend of 67% EP copolymer (20 mol % propylene)+33% EB copolymer (15 mol % but-1-ene)); TAFMER MH5010: g-MAH (0.6%) ethylene-butylene copolymer; TAFMER MH7010: g-MAH (0.7%) ethylene-butylene copolymer; Mitsui. TAFMER MH7020: g-MAH (0.7%) EP copolymer from Mitsui Chemicals; EXXELOR VA1801: g-MAH (0.7%) EP copolymer; EXXELOR VA1803: g-MAH (0.5-0.9%) EP copolymer, amorphous; EXXELOR VA1810: g-MAH (0.5%) EP copolymer; EXXELOR MDEX 94-1 1: g-MAH (0.7%) EPDM, Exxon Mobile Chemical; FUSABOND MN493D: g-MAH (0.5%) ethylene-octene copolymer; FUSABOND A EB560D (g-MAH) ethylene-n-butyl acrylate copolymer; ELVALOY, DuPont; Kraton FG1901GT: g-MAH (1.7%) SEBS with an S to EB ratio of 30:70.

Also preferred as component (D) is an ionomer in which the polymer-bonded carboxyl groups are joined to one another wholly or partly by metal ions.

Particularly preferred are copolymers of butadiene with styrene, functionalized by grafting with maleic anhydride, and apolar or polar olefin homopolymers and copolymers formed by grafting with maleic anhydride, and carboxylic acid-functionalized copolymers such as poly(ethene-co-(meth)acrylic acid) or poly(ethene-co-1-olefin-co-(meth) acrylic acid) in which the acid groups are partly neutralized with metal ions, or polymers which carry epoxy groups in the side chain.

With regard to the polymers having epoxy groups in the side chain, those preferred are copolymers composed of epoxy group-containing monomers and at least one further monomer, with both groups of monomers containing at least one polymerizable carbon-carbon double bond.

Preferred epoxy group-containing monomers are glycidyl acrylate and glycidyl methacrylate. The further monomers with a C—C double bond are preferably selected from alkenes (acyclic alkenes, cycloalkenes, polyenes), acrylic monomers, and vinyl monomers, with particular preference being given to acyclic alkenes having 2 to 10 carbon atoms, and to acrylic esters.

As component (D), therefore, preference is given to using copolymers of glycidyl acrylate and/or glycidyl methacrylate and at least one further unsaturated monomer which contains at least one nonaromatic carbon-carbon double bond, meaning that it is an olefinically unsaturated monomer. Component (D) preferentially is a copolymer of glycidyl acrylate and/or glycidyl methacrylate and at least one further olefinically unsaturated monomer, the concentration of the glycidyl acrylate and glycidyl methacrylate being in the range from 5 to 15 wt %, based on the copolymer.

It is preferred, moreover, if the further olefinically unsaturated monomer is a monounsaturated olefin, preferably an α-olefin, having 2 to 8 carbon atoms, or a (meth)acrylic ester, or a vinyl monomer. In particular, besides glycidyl acrylate and/or glycidyl methacrylate, the copolymer (D) comprises at least one further olefinically unsaturated monomer selected from the group consisting of ethene, propene, 1-butene, 2-butene, 1-pentene, 2-pentene, methyl (meth) acrylate, ethyl (meth)acrylate, propyl (meth)acrylate, isopropyl (meth)acrylate, butyl (meth)acrylate, acrylamide, and acrylonitrile. With particular preference, component (D) is a copolymer of glycidyl methacrylate and ethene and also, optionally, further olefinically unsaturated monomers, where the amount of ethene is in the range from 50 to 95 wt %, preferably in the range from 65 to 93 wt %, and more preferably in the range of 80-95 or 85 to 94.

Specific examples are copolymers of ethylene and glycidyl acrylate; ethylene and glycidyl methacrylate; ethylene, methyl methacrylate, and glycidyl methacrylate; ethylene, methyl acrylate, and glycidyl methacrylate; ethylene, ethyl acrylate, and glycidyl methacrylate; ethylene, butyl acrylate, and glycidyl methacrylate; ethylene and glycidyl methacrylate.

Particular preference is given to copolymers
of ethylene and glycidyl methacrylate with glycidyl methacrylate content of 7 to 14 wt %, based on the sum of all the monomers in the copolymer;
of 56-73 wt % of ethylene, 20-30 wt % of methyl acrylate, and 7-14 wt % of glycidyl methacrylate, based on the sum of all the monomers in the copolymer;
of 51-78 wt % of ethylene, 15-35 wt % of butyl acrylate, and 7-14 wt % of glycidyl methacrylate, based on the sum of all the monomers in the copolymer.

Particularly preferred examples of components (B) which can be used in accordance with the invention are the systems available from Arkema under the product name Lotader AX, particularly those of the type AX8840 (copolymer of 92% ethene and 8% glycidyl methacrylate) or of the type AX8900 (copolymer of 67% ethene, 25% methyl acrylate, and 8% glycidyl methacrylate). Likewise preferred are products of the Elvaloy type from Dupont, especially Elvaloy PTW (copolymer of 67% ethene, 28% butyl acrylate, and 5% glycidyl methacrylate), and also products of the Igetabond type, available from Sumitomo, especially Igetabond E (copolymer of 88% ethene and 12% glycidyl methacrylate).

Component (E):

Present in the molding composition as component (E) is 0-10 wt % of ethylene-vinyl acetate copolymer (EVA). One preferred embodiment is characterized in that the fraction of component (E) is in the range of 1.0-8.0 wt %, preferably in the range of 2.0-7.0 wt %.

Summarized generally, component (D) is preferentially designed as follows:

Component (E) is preferably an ethylene-vinyl acetate copolymer having a vinyl acetate content of 5-35%, preferably 8-25%, especially preferably 10-20%, the percentages being based in each case on the total mass of ethylene-vinyl acetate copolymer, including any grafting present.

According to a further preferred embodiment, component (E) preferably possesses a molar mass in the range from 20 000 to 500 000 g/mol, especially preferably in the range from 30 000 to 300 000 g/mol.

Component (E) may be ungrafted or grafted and, respectively, possesses acid or acid anhydride groups introduced by thermal or radical reaction of the main-chain polymer with an unsaturated dicarboxylic anhydride, an unsaturated dicarboxylic acid and/or an unsaturated dicarboxylic acid monoalkyl ester, preferably using at least one of the following systems: acrylic acid, methacrylic acid, maleic acid, maleic anhydride, maleic acid monobutyl ester, fumaric acid, aconitic acid, glycidyl acrylate, glycidyl methacrylate, or itaconic anhydride, this preferably in a concentration in the range from 0.1 to 6.0 wt %. The ethylene-vinyl acetate copolymer preferentially possesses grafting in a range of 0.2-4.0 wt %, especially preferably in a range of 0.5-2.5 wt %, the percentages by weight being based in each case on the total mass of ethylene-vinyl acetate copolymer, including grafting.

Component (E) with further preference is hydrolyzed to an extent of less than 30%, more preferably less than 10%, and preferably is unhydrolyzed. With preference, therefore, the EVA is also hydrolyzed to an extent of less than 30%, meaning that the proportion of vinyl alcohol groups based on the sum of the vinyl acetate groups and vinyl alcohol groups in the EVA (component E) is less than 30 mol %, more preferably less than 10 mol %. It is preferred more particularly if the EVA is unhydrolyzed, meaning that the degree of hydrolysis is 0%, and therefore there are no or virtually no vinyl alcohol groups present.

Looked at specifically now, component (E), alternatively or additionally, may further be generally characterized as follows, in accordance with one or more of the following further preferred embodiments:

The EVA preferentially possesses a molar mass in the range from 20 000 to 500 000 g/mol, especially preferably in the range from 30 000 to 300 000 g/mol.

A further preferred embodiment is notable, as stated, in that the ethylene-vinyl acetate copolymer is grafted, this improving compatibility with the polyamide, in particular.

The ethylene-vinyl acetate copolymer preferentially possesses acid or acid anhydride groups, introduced by thermal or radical reaction of the main-chain polymer with an unsaturated dicarboxylic anhydride, an unsaturated dicarboxylic acid or an unsaturated dicarboxylic acid monoalkyl ester, in a concentration sufficient for effective attachment to the polyamide. For this purpose, preferentially, reagents selected from the following group are used: acrylic acid, methacrylic acid, maleic acid, maleic anhydride, maleic acid monobutyl ester, fumaric acid, aconitic acid, glycidyl acrylate, glycidyl methacrylate and/or itaconic anhydride. Preferably 0.1 to 6.0 wt % of these reagents, preferably of an unsaturated anhydride or of an unsaturated carboxylic acid, is grafted onto the ethylene-vinyl acetate copolymers, or carboxylic acid or dicarboxylic anhydride or a precursor thereof is grafted on together with another unsaturated monomer.

With particular preference, grafting takes place using a reagent selected from the following group: acrylic acid, methacrylic acid, maleic anhydride, or combinations thereof; the grafting is preferably selected as acrylic acid.

The ethylene-vinyl acetate copolymer of component (E) here preferentially possesses grafting in a range of 0.2-4.0 wt %, especially preferably in a range of 0.5-2.5% wt %, where the weight percentages are based in each case on the total mass of ethylene-vinyl acetate copolymer, including grafting.

The molding composition is preferentially free from further compatibilizer when the EVA of component (E) used is grafted.

The EVA of component (E), moreover, is preferentially not crosslinked, meaning that the molding compositions are free from crosslinkers and radical initiators.

The EVA of component (E) preferentially used is one whose ethylene fraction is 79-86 wt %, whose vinyl acetate content is 13-18 wt %, and whose acrylic acid grafting makes up 1-3% (in each case based on the total weight).

Examples of commercially available EVA systems are as follows: Scona TPEV 1110 PB, Scona TPEV 1112 PB, Scona TPEV 2113 PB, Scona TPEV 5010 PB, Evatane 18-150, Evatane 20-20, Evantane 28-40, Ultrathene UE672, Ultrathene UE635000, Atea 1075A, Atea 1241, Atea 2842AC.

Component F:

According to one preferred embodiment, the fraction of additives of component (F) is in the range of 0.1-2.0 wt %, more particularly in the range of 0.2-1.5 wt %.

The additives of component (F) are further preferentially selected from the following group or a mixture thereof: adhesion promoters, crystallization accelerators or retardants, antioxidants, antiozonants, light stabilizers, heat stabilizers, such as, for example, phenols, phosphites, aromatic amines, copper halides, especially in combination with alkali metal halides, cerium oxide hydrates, lanthanum salts, UV stabilizers, UV absorbers, UV blockers, lubricants, mold release agents, plasticizers, processing assistants, antistats, organic and inorganic pigments, dyes and marker substances, nanoparticles in platelet form, pigmentary carbon black, such as, for example, Cabot Black Pearls 880 or Corax N115, preferably in the form of pigmentary carbon black masterbatch (concentrate), such as, for example, Euthylen black, residues from polymerization processes such as catalysts, salts and derivatives thereof, and also regulators such as monoacids or monoamines, and/or oxygen-, nitrogen- or sulfur-containing metal compounds as stabilizers, in which case metals such as aluminum, calcium, barium, sodium, potassium, magnesium and/or zinc are preferred, and especially preferably compounds selected from the group of oxides, hydroxides, carbonates, silicates, borates, phosphates, stannates, and also combinations or mixtures of these compounds, such as oxide hydroxides or oxide hydroxide carbonates. With regard to the copper halides, preference is given to using copper(I) bromide or copper(I) iodide in combination with alkali metal halides, especially potassium bromide or potassium iodide. A particularly preferred combination is that of copper(I) iodide and potassium iodide, where the molar ratio of copper(I) iodide to potassium iodide is in the range of preferably 1-20, more particularly of 4-12. The present invention further relates to a molding producible or produced from a molding composition as set out above, more particularly produced in an injection molding process, extrusion blowmolding process or an extrusion process.

The molding may be in the form of a film, a profile or a hollow body, or connecting element, including containers, lines, plug connection elements, housing parts, fastening elements, pump parts, valves, distributors, lids, injector rails, filling ports, pump housings, fuel filter housings, valve housings, more particularly for the automobile sector, including those in contact with chemicals, more particularly fuel, methanol-containing fuel, coolants, urea, oils.

The invention further relates to the use of a polyamide molding composition, preferably in the form of a molding as set out above, in the automobile sector, preferably as line element for fuels, including fuel lines, fuel tanks, pumps, pump parts, injector rails, valves, and also connecting and fastening elements for these, more particularly quick connectors.

Further embodiments are specified in the dependent claims.

DESCRIPTION OF PREFERRED EMBODIMENTS

Preferred embodiments of the invention are described below with reference to the working examples, which serve merely for elucidation and should not be interpreted restrictively.

Production of the Molding Compositions and of the Moldings Used for the Measurements:

The molding compositions with the constitutions in tables 1 and 2 were produced on a model ZSK 25 twin-screw extruder from Werner u. Pfleiderer. For this, components (A) and (D) to (F) were metered into the intake zone. The carbon fibers (B) and also the glass fibers (C) were metered into the polymer melt via a side feeder 3 barrel units ahead of the die. The barrel temperature was set as a rising profile up to 350° C. A 10 kg throughput was achieved at 150 to 200 rpm. The compounds were taken off as a strand from a die with a diameter of 3 mm and were pelletized after water cooling. After pelletization and drying at 110° C. for 24 h, the pellet properties were measured and the test specimens were produced.

The test specimens were produced on an Arburg Allrounder 320-210-750 injection molding machine, with the cylinder temperatures set at from 310° C. to 350° C. and with a screw peripheral velocity set at 15 m/min. The mold temperature selected was 100-140° C.

Starting materials employed were as follows:

| | |
|---|---|
| PA-1 | Polyamide PA 6T/66 (55:45) having a relative viscosity of 1.67, a melting point of 310° C., and an enthalpy of fusion of $\Delta Hm$ = 62 J/g |
| PA-2 | Polyamide PA 66 having a relative viscosity of 1.85 and a melting point of 260° C. |
| PA-3 | Polyamide PA 6T/6I (70:30) having a relative viscosity of 1.58, a melting point of 325° C., and an enthalpy of fusion of $\Delta Hm$ = 55 J/g |
| PA-4 | Polyamide PA 6T/MPDT (50:50) having a relative viscosity of 1.62, a melting point of 305° C., and an enthalpy of fusion of $\Delta Hm$ = 45 J/g |
| IM-1 | Impact modifier based on ethylene/propylene and ethylene/butylene copolymers, Tafmer MC201, Mitsui |
| IM-2 | Ethylene/glycidyl methacrylate copolymer of 92% ethene and 8% glycidyl methacrylate, MFR = 5 g/10 min (ISO 1133, 190° C./2.16 kg), Lotader AX 8840, Arkema |
| IM-3 | Impact modifier based on a maleic anhydride-modified (100 μeq/g) α-olefin polymer (ethylene/butylene copolymer), Tafmer MH-7010, Mitsui |
| EVA | Ethylene-vinyl acetate copolymer, containing 14 wt % of vinyl acetate and grafted with 2 wt % of acrylic acid, Scona TPEV 1110 PB, BYK |
| GF | Glass fiber, Vetrotex 995-10C, length 4.5 mm, diameter 10 μm (glass fiber with circular cross-sectional area) |
| CF | Carbon fiber, Tenax E-HT C604, length 6 mm, diameter 6 μm (carbon fiber with circular cross-sectional area), Toho Tenax Europe GmbH (DE) |
| CB | Electrically conductive carbon black with a DBP absorption of 480-510 ml/100 g, Ketjenblack EC-600 JD, AkzoNobel |
| Additives | Mixture of 0.15 wt % Irganox 1098 (BASF), 0.15 wt % Hostanox PAR24 (Clariant), and 0.2 wt % Polywhite B (Imerys), in each case based on the overall molding composition. |

Results:

The tables summarize the compositions of the inventive examples (table 1) and comparative examples (table 2) and the results of the measurements on the test specimens produced from them.

TABLE 1

Compositions and measurements on the examples according to the invention

|  |  |  | IE1 | IE2 | IE3 | IE4 | IE5 | IE6 | IE7 |
|---|---|---|---|---|---|---|---|---|---|
| PA-1 |  | wt % | 55.5 | 56.5 | 54.5 | 58.6 | 55.0 | 50.0 |  |
| PA-2 |  | wt % |  |  | 4.0 |  |  |  |  |
| PA-3 |  | wt % |  |  |  |  |  |  | 57.5 |
| IM-1 |  | wt % |  |  |  | 6.0 | 4.5 | 4.5 |  |
| IM-2 |  | wt % | 3.0 | 3.0 |  |  |  |  | 7.0 |
| EVA |  | wt % | 6.0 | 6.0 | 6.0 |  |  |  |  |
| GF |  | wt % | 20.0 | 20.0 | 20.0 | 20.0 | 25.0 | 30.0 | 20.0 |
| CF |  | wt % | 15.0 | 14.0 | 15.0 | 15.0 | 15.0 | 15.0 | 15.0 |
| Additives |  | wt % | 0.5 | 0.5 | 0.5 | 0.5 | 0.5 | 0.5 | 0.5 |
| Surface resistance | 0 h | ohm | 27 | 44 | 37 | 45 | 10 | 72 | 25 |
| according to storage | 100 h | ohm | 260 | 450 | 500 | 380 | 110 | 570 | 170 |
| time in CM15 | 5000 h | ohm | 8.8E+2 | 6.2E+3 | 4.5E+3 | 1.1E+5 | 8.9E+4 | 3.1E+5 | 4.9E+4 |
| Volume resistance | 0 h | ohm * m | 0.7 | 1.1 | 0.7 | 3.9 | 2.6 | 2.8 | 2.9 |
| according to storage | 100 h | ohm * m | 3.8 | 12.5 | 6.7 | 46 | 530 | 20 | 450 |
| time in CM15 | 5000 h | ohm * m | 49 | 90 | 55 | 3.8E+2 | 4.5E+2 | 7.5E+2 | 4.1E+2 |
| Tensile elasticity modulus | dry/23° C. | MPa | 18350 | 18100 | 18400 | 18100 | 18500 | 19900 | 18300 |
| Breaking strength | dry/23° C. | MPa | 212 | 208 | 220 | 208 | 198 | 212 | 208 |
| Elongation at break | dry/23° C. |  | 1.8 | 1.9 | 1.8 | 2.0 | 1.7 | 1.8 | 1.7 |
| Impact toughness | dry/23° C. | kJ/m$^2$ | 65 | 68 | 54 | 64 | 60 | 55 | 64 |
| Notched impact toughness | dry/23° C. | kJ/m$^2$ | 10 | 10 | 7.5 | 10 | 10 | 9.4 | 9.2 |
| Surface quality |  | — | + | + | + | ○ | ○ | ○ | ○ |
| MVR (330° C./10 kg) |  | cm$^3$/10 min | 237 | 250 | 214 | 92 | 66 | 55 | 86 |
| HDT A (1.80 MPa) |  | ° C. | >280 | >280 | >280 | >280 | >280 | >280 | >280 |
| HDT C (8.00 MPa) |  | ° C. | 224 | 220 | 220 | 193 | 202 | 215 | 195 |

TABLE 2

Compositions and measurements on the comparative examples

|  |  |  | CE1 | CE2 | CE3 | CE4 | CE5 | CE6 |
|---|---|---|---|---|---|---|---|---|
| PA-1 |  | wt % | 60.0 | 79.5 | 75.5 | 72.5 |  | 59.5 |
| PA-3 |  | wt % |  |  |  |  | 72.5 |  |
| IM-1 |  | wt % | 4.5 | 5.0 | 6.0 |  |  | 5.0 |
| IM-2 |  | wt % |  |  |  | 3.0 | 7.0 |  |
| EVA |  | wt % |  |  |  | 6.0 |  |  |
| GF |  | wt % | 25.0 |  |  |  |  | 25.0 |
| CF |  | wt % | 10.0 | 15.0 | 18.0 | 18.0 | 20.0 |  |
| CB |  | wt % |  |  |  |  |  | 10.0 |
| Additives |  | wt % | 0.5 | 0.5 | 0.5 | 0.5 | 0.5 | 0.5 |
| Surface resistance | 0 h | ohm | 3.4E+4 | 2.3E+4 | 4.2 | 4.0 | 1.8E+2 | 2.3E+1 |
| according to storage | 100 h | ohm | 2.9E+7 | 2.1E+8 | 5.5E+6 | 2.8E+6 | 4.7E+8 | 3.1E+1 |
| time in CM15 | 5000 h | ohm | n.d. | n.d. | 2.7E+8 | 7.1E+7 | n.d. | 2.5E+3 |
| Volume resistance | 0 h | ohm * m | 4.5E+3 | 3.2E+5 | 62 | 60 | 3.6 | 8.6E−2 |
| according to storage | 100 h | ohm * m | 2.8E+8 | 1.6E+7 | 4.7E+5 | 1.9E+5 | 1.1E+7 | 2.1E−1 |
| time in CM15 | 5000 h | ohm * m | n.d. | n.d. | 2.7E+7 | 2.3E+7 | n.d. | n.d. |
| Tensile elasticity modulus | dry/23° C. | MPa | 14600 | 11100 | 14700 | 14500 | 16200 | 8500 |
| Breaking strength | dry/23° C. | MPa | 188 | 180 | 209 | 204 | 216 | 63 |
| Elongation at break | dry/23° C. | % | 2.2 | 3.5 | 3.0 | 3.0 | 2.4 | 0.8 |
| Impact toughness | dry/23° C. | kJ/m$^2$ | 64 | 72 | 69 | 63 | 63 | 14 |
| Notched impact toughness | dry/23° C. | kJ/m$^2$ | 11 | 10 | 11 | 10 | 9.6 | 3.8 |
| Surface quality |  | — | ○ | ○ | ○ | + | ○ | ○ |
| MVR (330° C./10 kg) |  | cm$^3$/10 min | 32 | 34 | 31 | 210 | 55 | 12 |
| HDT A (1.80 MPa) |  | ° C. | 277 | 244 | 266 | 262 | 234 | 205 |
| HDT C (8.00 MPa) |  | ° C. | 151 | 100 | 143 | 131 | 130 | 97 | n.d.: not determined

TABLE 3

Compositions and measurements on the further comparative examples

|  |  |  | CE7 | CE8 | CE9 |
|---|---|---|---|---|---|
| PA-1 |  | wt % | 69.5 | 67.5 |  |
| PA-4 |  | wt % |  |  | 69.5 |
| Tafmer MH-7010 |  | wt % | 5.0 | 5.0 | 5.0 |
| GF |  | wt % | 10.0 | 10.0 | 10.0 |
| CF |  | wt % | 15.0 | 17.0 | 15.0 |
| Additives |  | wt % | 0.5 | 0.5 | 0.5 |
| Surface resistance | 0 h | ohm | 2.0E+3 | 1.0E+3 | 1.7E+2 |
| according to | 100 h | ohm | 3.9E+8 | 7.0E+8 | 1.4E+9 |
| storage time in CM15 | 5000 h | ohm | n.d. | n.d. | n.d. |
| Volume resistance | 0 h | ohm*m | 5.5E+1 | 2.3E+1 | 1.1E+1 |
| according to | 100 h | ohm*m | 1.1E+7 | 6.6E+4 | 4.6E+7 |
| storage time in CM15 | 5000 h | ohm*m | n.d. | 3.4E+7 | n.d. |
| Tensile elasticity modulus | dry/23° C. | MPa | 13700 | 15300 | 13800 |
| Breaking strength | dry/23° C. | MPa | 183 | 193 | 185 |
| Elongation at break | dry/23° C. | % | 2.9 | 2.3 | 2.8 |
| Impact toughness | dry/23° C. | kJ/m$^2$ | 71 | 65 | 70 |
| Notched impact toughness | dry/23° C. | kJ/m$^2$ | 10 | 9.3 | 9 |
| Surface quality |  | — | o | o | o |
| MVR (330° C./10 kg) |  | cm$^3$/10 min | 44 | 40 | 34 |
| HDT A (1.80 MPa) |  | ° C. | 264 | 278 | 262 |
| HDT C (8.00 MPa) |  | ° C. | 161 | 164 | 165 | n.d.: not determined

Measurement Methods:

The measurements for the values from tables 1 and 2 and, respectively, for characterizing the starting materials were carried out according to the following standards and on the following test specimens, and, unless noted otherwise in the following tables, in the dry state.

Tensile Elasticity Modulus:

ISO 527 (Parts 1 and 2, 2012-02) with a tensioning rate of 1 mm/min, temperature 23° C.; ISO tensile bar, standard: ISO/CD 3167, type A1, 170×20/10×4 mm.

Breaking Strength and Elongation at Break:

ISO 527 (Parts 1 and 2, 2012-02) with a tensioning rate of 5 mm/min, temperature 23° C.; ISO tensile bar, standard: ISO/CD 3167, type A1, 170×20/10×4 mm.

Relative Viscosity:

DIN EN ISO 307 (2013-08), in 0.5 wt % strength m-cresol solution, temperature 20° C.

Thermal characteristics (melting point, enthalpy of fusion and glass transition temperature (Tg):

ISO standard 11357-1 (2009-10), -2 (2013-05) and -3 (2011-05); the differential scanning calorimetry (DSC) is carried out on the pelletized material, with a heating rate of 20° C./min.

Impact Toughness and Charpy Notched Impact Toughness:

ISO 179/keU (2010-11, 2011-06), temperature 23° C.; ISO test bar, standard: ISO/CD 3167, type B1, 80×10×4 mm.

Heat deflection temperature HDT A (1.80 MPa), HDT C (8.00 MPa)

DIN EN ISO 75-1, -2 (2013-04); ISO impact bar with dimensions of 80×10×4 mm (in flat end position).

Specific Electrical Volume Resistance:

(also called volume resistivity, in [ohm*m])

DIN IEC 60093:1993-12; 100×100×2 mm plates, contacted with conductive silver; current/voltage measurement method; round copper electrodes with a diameter of 30 mm are arranged on opposite sides of the sample plates; the measurement voltage is 100 V up to a volume resistance of 300 megaohms, 500 V beyond that (direct-current voltage in each case); measurement takes place within 20 minutes after removal of the plates, which have been stored dry, under standard conditions at 23° C. and 50% relative humidity; the values reported in the tables are average values, determined from independent measurements on 5 different plates produced from the molding composition of the respective example.

Specific Electrical Surface Resistance:

(owing to the electrode arrangement, also referred to as Ω square, in [ohm])

DIN IEC 60093:1993-12; 100×100×2 mm plates, contacted with conductive silver; current/voltage measurement method, copper electrodes 10×10×100 mm in a spacing of 10 mm; the measurement voltage is 100 V up to a surface resistance of 300 megaohms, 500 V beyond that (direct-current voltage in each case); measurement takes place within 20 minutes after removal of the plates, which have been stored dry, under standard conditions at 23° C. and 50% relative humidity; the values reported in the tables are average values, determined from independent measurements on 5 different plates produced from the molding composition of the respective example.

MVR (Melt Volume Flow Rate) as Measure of the Flow Behavior

ISO 1133 (2011-12) at a temperature of 330° C. under a load of 10.0 kg.

Surface Quality:

Visual assessment of the injection moldings (plates 100×100×2 mm and connectors for pipes with an outer diameter of 8 mm):

o: inhomogeneous, matt, rough surface; visible streaks and reinforcing fibers

+: homogeneous, smooth, impervious surface over the entire molding

Storage in White Spirit:

In order to investigate the effect of gasoline on the electrical resistance values, 100×100×2 mm plates (dry as produced) were stored at 60° C. in CM15 white spirit, consisting of 42.5 vol % toluene, 42.5 vol % isooctane and 15 vol % methanol, for up to a maximum of 5000 hours (h), with samples being taken at different points in time. For this purpose, the test specimens in the white spirit were cooled to 23° C., rubbed down with a cotton cloth after removal from the white spirit, and stored in a desiccator over a siccative (silica gel). The surface and volume resistances were determined within 24 h following removal from the white spirit. Determined for comparison were the resistance values of the plates, dry as produced, without spirit storage (0 hours (0 h) storage). In addition to this initial value, the tables report the resistance values for a storage time of 100 hours (100 h) and 5000 hours (5000 h).

Discussion

Comparative example CE1 shows that a polyamide molding composition with 10% carbon fibers and 25% glass fibers does have adequate conductivity immediately after production, but that after just 100 hours after storage in CM15, the specified limit value of 1 E+6 for the specific surface resistance is exceeded.

If, instead of the carbon fibers, conductive carbon black is used as electrically conductive agent, as in CE6, the required conductivity is also achieved after 5000 hours of storage in CM15, but the mechanical properties of the molding composition are inadequate.

Where carbon fibers are used exclusively as reinforcing fibers and as electrically conductive agent, experiments CE2 to CE5 show that sufficient conductivity after storage in CM15 is not achieved, not even when the CF concentration is raised from 15 to 20 wt %. The CF-reinforced molding compositions have good mechanical properties, albeit with a low elasticity modulus.

Comparative examples CE2-CE5 therefore show that the lower limit for the fraction of carbon fibers is important, and that the simultaneous presence of carbon fibers and glass fibers in the proportions claimed is a factor.

Comparative examples CE7-CE9 show molding compositions in which the fraction of carbon fibers is in the range of 13-22 percent by weight, but in which the fraction of glass fibers is not in the range of 18-30 percent by weight, but instead lower. With these comparative examples it is found that in the case of these molding compositions as well, unexpectedly, there is a rapid increase in the surface resistance and in the volume resistance, in spite of the high fraction of carbon fibers and the simultaneous presence of glass fibers. Below the limit of 18 percent by weight of glass fibers, therefore, the advantageous properties unexpectedly end. Moreover, the surface quality in the case of these CE7-CE9 molding compositions is inadequate, and the mechanical properties are likewise mostly inferior to the values from the molding compositions of the invention, as documented in tab. 1. Where the polyamide matrix used comprises systems based on short-chain aliphatic diamines with too low a glass fiber content, there are unacceptable increases in surface resistance and volume resistance after storage for 100 hours.

The inventive examples IE1 to IE7 demonstrate that, when carbon fibers and glass fibers are used simultaneously in a suitable ratio, they produce molding compositions which even after 5000 hours of storage in CM15 do not exceed the limit value for the specific surface resistance, of 1 E+6 ohms. Moreover, these molding compositions exhibit good mechanical properties and a high elasticity modulus. The molding compositions in IE1 to IE3, furthermore, possess excellent flowability and produce moldings having good surface quality. At the same time, the retention of the electrical conductivity through addition of ethylene-vinyl acetate copolymer is further improved. Hence, in comparison to inventive examples 1E4 to IE7, the molding compositions of inventive examples IE1 to IE3 have a specific surface resistance after 5000 hours of storage at 60° C. in CM15 that is lower by a factor of 10-100.

The invention claimed is:

1. A polyamide molding composition consisting of the following components:
(A) 35-68 wt % of at least one semicrystalline, semiaromatic, thermoplastic polyamide having a melting temperature ($T_m$) of at least 270° C., measured according to ISO standard 11357-3 on pelletized material with a heating rate of 20° C./min;
where component (A) is composed of:
(A1) 25-100 mol % of terephthalic acid, based on the total amount of dicarboxylic acids present,
0-75 mol %, based on the total amount of dicarboxylic acids present, of at least one dicarboxylic acid selected from the following group: non-terephthalic acid aromatic dicarboxylic acid having 8 to 20 carbon atoms, aliphatic dicarboxylic acid having 6 to 36 carbon atoms, or cycloaliphatic dicarboxylic acid having 8 to 20 carbon atoms,
(A2) 50-100 mol %, based on the total amount of diamines present, of at least one aliphatic diamine having 4-8 carbon atoms,
0-50 mol %, based on the total amount of diamines present, of at least one diamine selected from the following group: cycloaliphatic diamine having 6 to 20 carbon atoms, or araliphatic diamine having 8 to 20 carbons,
where the percentage molar amount of dicarboxylic acids is 100 mol % and the percentage molar amount of diamines is 100 mol %,
and also of:
(A3) 0-100 mol % of aminocarboxylic acids and/or lactams having 4 to 36 carbon atoms with the proviso that the concentration of (A3) is at most 40 wt %, based on the sum of (A1) to (A3),
(B) 13-22 wt % of carbon fibers;
(C) 18-30 wt % of glass fibers;
(D) 1-10 wt % of at least one of an impact modifier other than (E) and (F) or of at least one polymer selected from the group consisting of: aliphatic polyamide or polyolefin;
(E) 0-10 wt % of ethylene-vinyl acetate copolymer;
(F) 0-3 wt % of additives
where the sum of components (A)-(F) is 100 wt %,
the sum of components (B)-(C) is in the range from 33 to 48 wt %, and
the sum of components (D)-(E) is in the range from 1 to 12 wt %.

2. The polyamide molding composition as claimed in claim 1, wherein at least one of the following conditions applies:
the fraction of component (A) is in the range of 40-62.9 wt %; or
the fraction of component (B) is in the range of 14-20 wt %; or
the fraction of component (C) is in the range of 20-28 wt %; or
the fraction of component (D) is in the range of 2-8 wt %;
the fraction of component (E) is in the range of 1-8 wt %; or
the fraction of component (F) is in the range of 0.1-2.0 wt %; or
the sum of components (B)-(C) in the range of 34-45 wt %; or
the sum of components (D)-(E) in the range of 2-10 wt %.

3. The polyamide molding composition as claimed in claim 1, wherein component (A) is a polyamide or a mixture of polyamides having a melting temperature ($T_m$), measured according to ISO standard 11357-3 on pelletized material with a heating rate of 20° C./min, in the range from 280° C. to 340° C.; or
wherein the enthalpy of fusion of component (A) is in the range from 30 to 70 J/g; or
wherein component (A) has a solution viscosity, measured according to ISO 307 in m-cresol (0.5 wt %, 20° C.) of $\eta_{rel}$ less than 2.6.

4. The polyamide molding composition as claimed in claim 1, wherein the polyamide or the polyamides of component (A) is composed of:
(A1) 40-100 mol %, of terephthalic acid, based on the total amount of dicarboxylic acids present,
0-60 mol %, based on the total amount of dicarboxylic acids present, of at least one dicarboxylic acid selected from the following group: non-terephthalic acid aromatic dicarboxylic acid having 8 to 20 carbon atoms, aliphatic dicarboxylic acid having 6 to 36 carbon atoms, or cycloaliphatic dicarboxylic acid having 8 to 20 carbon atoms, (A2) 50-100 mol %, based on the total amount of diamines present, of at least one aliphatic diamine having 4-8 carbon atoms, 0-50 mol %, based on the total amount of diamines present, of at least one diamine selected from the following group: cycloaliphatic diamine having 6 to 20 carbon atoms, or araliphatic diamine having 8 to 20 carbons, where the percentage molar content of dicarboxylic acids is 100 mol % and the percentage molar content of diamines is 100 mol %, and also of:

(A3) 0-100 mol % of aminocarboxylic acids and/or lactams having 4 to 36 carbon atoms, with the proviso that the concentration of (A3) is at most 40 wt %, based on the sum of (A1) to (A3).

5. The polyamide molding composition as claimed in claim 1, wherein the polyamide or the polyamides of component (A) are selected from the group consisting of: PA 4T/46, PA 4T/66, PA 4T/4I, PA 4T/4I/46, PA 4T/46/66, PA 4T/4I/66, PA 4T/56, PA 5T/56, PA 5T/5I, PA 5T/66, PA 6T/6I, PA 6T/66, PA 6T/610, PA 6T/612, PA 6T/12, PA 6T/11, PA 6T/6, PA 6T/MACM10, PA 6T/MACM12, PA 6T/MACM18, PA 6T/MACMI, PA MACMT/6I, PA 6T/PACM6, PA 6T/PACM10, PA 6T/PACM12, PA 6T/PACM18, PA 6T/PACMI, PACMT/6I, PA MPDT/MPDI, PA MPDT/MPD6, PA 6T/MPDI, PA 6T/MPDT, PA 6T/6I/66, PA 6T/6I/6, PA 6T/6I/12, PA 6T/66/6, PA 6T/66/12, PA 6T/6I/MACMI, PA 6T/66/PACM6, or a mixture of such systems.

6. The polyamide molding composition as claimed in claim 1, wherein component (A) is formed by at least one semicrystalline polyamide 6T/6I having 50 to 80 mol % of hexamethyleneterephthalamide units and 20 to 50 mol % of hexamethyleneisophthalamide units, or wherein component (A) is formed by at least one semicrystalline polyamide 6T/66 having 50 to 80 mol % of hexamethyleneterephthalamide units and 20 to 50 mol % of hexamethyleneadipamide units; or wherein component (A) is formed by at least one semicrystalline ternary polyamide 6T/6I/66 having 50 to 70 mol % of hexamethyleneterephthalamide, 5 to 45 mol % of hexamethyleneisophthalamide units and 5 to 45 mol % of hexamethyleneadipamide units, or wherein component (A) is formed by at least one 6T/6I/X having at least 50 mol % of hexamethyleneterephthalamide, 0 to 40 mol % of hexamethyleneisophthalamide, and 10 to 40 mol % of aliphatic units of the formula —NH—(CH2)n-1-CO—, where n is 6, 11 or 12, or by a 6T/6I/X having at least 50 mol % of hexamethyleneterephthalamide, 10 to 30 mol % of hexamethyleneisophthalamide and 10 to 40 mol % of aliphatic units of the formula —NH—(CH2)n-1-CO—, where n is 6, 11 or 12, or by a 6T/6I/X having 52 to 73 mol % of hexamethyleneterephthalamide, 0 to 36 mol % of hexamethyleneisophthalamide, and 12 to 40 mol % of aliphatic units of the formula —NH—(CH2)n-1-CO—, where n is 6, 11 or 12, or by a 6T/6I/X having 52 to 73 mol % of hexamethyleneterephthalamide and 10 to 36 mol % of hexamethyleneisophthalamide units, 12 to 38 mol % of aliphatic units of the formula —NH—(CH2)n-1-CO—, where n is 6, 11 or 12.

7. The polyamide molding composition as claimed in claim 1, wherein at least one of the following conditions applies:

component (B) takes the form of chopped fibers or of chopped or continuous fiber bundles, or the fibers of component (B) have a length of 0.1 to 50 mm, or the fibers of component (B) are based on PAN fibers, pitch fibers or cellulose-based fibers, or the fibers of component (B) are anisotropic, or the fibers of component (B) take the form of carbon fiber bundles composed of several hundred to hundred thousand individual filaments which have a diameter of 5 to 10 μm, a tensile strength of 1000 to 7000 MPa, and an elasticity modulus of 200 to 700 GPa.

8. The polyamide molding composition as claimed in claim 1, wherein the fibers of component (C) have a circular or noncircular cross-sectional area.

9. The polyamide molding composition as claimed in claim 1, wherein the fibers of component (C) are glass fibers which are composed substantially of the components silicon dioxide, calcium oxide, magnesium oxide, and aluminum oxide, or consist of these components, and the SiO2/(CaO+MgO) weight ratio is less than 2.7, or wherein the fibers of component (C) are glass fibers having a circular cross section with a diameter in the range of 5-20 μm.

10. The polyamide molding composition as claimed in claim 1, wherein component (D), if selected as an impact modifier different from (E) or different from (F), is selected from the group consisting of: natural rubber, graft rubber, homopolymers or copolymers of at least one of olefins or styrenes and derivatives thereof or acrylates and derivatives thereof or vinyl acetates and derivatives thereof or anhydrides, and wherein the impact modifier different from (E) is ungrafted or grafted.

11. The polyamide molding composition as claimed in claim 1, wherein component (E) is an ethylene-vinyl acetate copolymer having a vinyl acetate content of 5-35%, the percentages being based on the total mass of ethylene-vinyl acetate copolymer, including any grafting present, or component (E) possesses a molar mass in the range from 20 000 to 500 000 g/mol, or component (E) is grafted or possesses acid or acid anhydride groups which have been introduced by thermal or radical reaction of the main-chain polymer with an unsaturated dicarboxylic anhydride, an unsaturated dicarboxylic acid or an unsaturated dicarboxylic monoalkyl ester, or component (E) is hydrolyzed to an extent of less than 30%.

12. The polyamide molding composition as claimed in claim 1, wherein additives of component (F) are selected from the following group or a mixture thereof: adhesion promoters; crystallization accelerators; crystallization retardants; antioxidants; antiozonants; light stabilizers; heat stabilizers; UV stabilizers; UV absorbers; UV blockers; lubricants; mold release agents; plasticizers; processing assistants; antistats; organic and inorganic pigments; dyes and marker substances; nanoparticles in platelet form; pigment-grade carbon black; residues from polymerization processes; chain transfer agents, said chain transfer agents including monoacids or monoamines; or oxygen-, nitrogen- or sulfur-containing metal compounds as stabilizers.

13. A molding producible or produced from a molding composition as claimed in claim 1.

14. The molding according to claim 13 produced in an injection molding process, extrusion blowing process or extrusion process, in the form of a foil, a profile or a hollow body, or connecting element.

15. The molding according to claim 14 in the form of a container, line, plug connection element, housing part, fastening element, pump part, valve, distributor, lid, injector rail, filling port, pump housing, or fuel filter housing, and for contact with chemicals in the automobile sector in the form of fuel; coolant; urea; oils.

16. The molding according to claim 14 in the form of a container, line, plug connection element, housing part, fastening element, pump part, valve, distributor, lid, injector rail, filling port, pump housing, or fuel filter housing, and for contact with chemicals in the automobile sector in the form of methanol-containing fuel; coolant; urea; oils.

17. A method of using of a polyamide molding composition in the form of a molding as claimed in claim 13, in the automobile sector as a line element for fuels.

18. The method as claimed in claim 17, in the automobile sector, where the molding comprises a fuel line, a fuel tank, a pump, a pump part, an injector rail, a valve, and also connecting and fastening elements therefore.

19. Method of using a polyamide molding composition according to claim 1 for the making of a molding in the automobile sector, connecting and fastening elements.

20. The polyamide molding composition as claimed in claim 1, wherein the aminocarboxylic acids or lactams of (A3) have 6 to 12 carbon atoms.

21. The polyamide molding composition as claimed in claim 1, wherein at least one of the following conditions applies:
the fraction of component (A) is in the range of 50-58.8 wt %;
the fraction of component (B) is in the range of 15-18 wt %;
the fraction of component (C) is in the range of 20-25 wt %;
the fraction of component (D) is in the range of 3-6 wt %;
the fraction of component (E) is in the range of 2-6 wt %;
the fraction of component (F) is in the range of 0.2-1.5 wt %
the sum of components (B)-(C) is in the range of 35-40 wt %,
the sum of components (D)-(E) is in the range of 4-9 wt %.

22. The polyamide molding composition as claimed in claim 1, wherein component (A) is a polyamide or a mixture of polyamides having a melting temperature (Tm), measured according to ISO standard 11357-3 on pelletized material with a heating rate of 20° C./min, in the range from 285° C. to 330° C., where, when a mixture is present as component (A), not only the mixture but also each of the individual components within (A) has such a melting temperature; or
wherein the enthalpy of fusion of component (A) is in the range from 40 to 65 J/g, where, when a mixture is present as component (A), not only the mixture but also each of the individual components within (A) has such an enthalpy of fusion; or
wherein component (A) has a solution viscosity, measured according to ISO 307 in m-cresol (0.5 wt %, 20° C.), of ηrel less than 2.0, and of ηrel at least 1.55, where, when a mixture is present as component (A), not only the mixture but also each of the individual components within (A) has such a solution viscosity.

23. The polyamide molding composition as claimed in claim 1, wherein the polyamide or the polyamides of component (A) is formed only by one semicrystalline semiaromatic polyamide, and is composed of:
(A1) 50-80 mol %, of terephthalic acid, based on the total amount of dicarboxylic acids present,
20-50 mol %, based on the total amount of dicarboxylic acids present, of at least one dicarboxylic acid selected from the following group: non-terephthalic acid aromatic dicarboxylic acid having 8 to 20 carbon atoms, aliphatic dicarboxylic acid having 6 to 36 carbon atoms, or cycloaliphatic dicarboxylic acid having 8 to 20 carbon atoms,
(A2) 80-100 mol %, based on the total amount of diamines present, of at least one aliphatic diamine having 4-8 carbon atoms,
0-20 mol %, based on the total amount of diamines present, of at least one diamine selected from the following group: cycloaliphatic diamine having 6 to 20 carbon atoms, or araliphatic diamine having 8 to 20 carbons,
where the percentage molar content of dicarboxylic acids is 100 mol % and the percentage molar content of diamines is 100 mol %,
and also of:
(A3) 0-100 mol % of aminocarboxylic acids and/or lactams having 6 to 12 carbon atoms,
with the proviso that the concentration of (A3) is at most 20 wt %, based on the sum of (A1) to (A3).

24. The polyamide molding composition as claimed in claim 1, wherein the polyamide or the polyamides of component (A) are selected from the following group: PA 4T/46, PA 4T/66, PA 4T/4I, PA 4T/4I/46, PA 4T/46/66, PA 4T/4I/66, PA 4T/56, PA 5T/56, PA 5T/5I, PA 5T/66, PA 6T/6I, PA 6T/66, PA 6T/610, PA 6T/612, PA 6T/12, PA 6T/11, PA 6T/6, PA 6T/MACM10, PA 6T/MACM12, PA 6T/MACM18, PA 6T/MACMI, PA MACMT/6I, PA 6T/PACM6, PA 6T/PACM10, PA 6T/PACM12, PA 6T/PACM18, PA 6T/PACMI, PACMT/6I, PA MPDT/MPDI, PA MPDT/MPD6, PA 6T/MPDI, PA 6T/MPDT, PA 6T/6I/66, PA 6T/6I/6, PA 6T/6I/12, PA 6T/66/6, PA 6T/66/12, PA 6T/6I/MACMI, PA 6T/66/PACM6, or a mixture of such systems, where the fraction of terephthalic acid in the component is at least 62 mol %.

25. The polyamide molding composition as claimed in claim 1, wherein component (A) is formed by at least one semicrystalline polyamide 6T/6I having 62 to 73 mol % of hexamethyleneterephthalamide units and 25 to 38 mol % of hexamethyleneisophthalamide units, or
wherein component (A) is formed by at least one semicrystalline polyamide 6T/66 having 52 to 62 mol % of hexamethyleneterephthalamide units and 38 to 48 mol % of hexamethyleneadipamide.

26. The polyamide molding composition as claimed in claim 1, wherein the fibers of component (B) have a length of 1 to 12 mm, or a diameter of 5 to 10 µm.

27. The polyamide molding composition as claimed in claim 1, wherein the fibers of component (C) have noncircular cross-sectional area having a dimensional ratio of the principal cross-sectional axis to the secondary cross-sectional axis perpendicular thereto of 2.5 to 5, or the length of the principal cross-sectional axis is in the range from 15 to 30 µm, and the length of the secondary cross-sectional axis is in the range from 4 to 10 µm.

28. The polyamide molding composition as claimed in claim 1, wherein the fibers of component (C) are glass fibers which are composed substantially of the components silicon dioxide, calcium oxide, magnesium oxide, and aluminum oxide, or consist of these components, and the SiO2/(CaO+MgO) weight ratio is between 2.1 and 2.4, or are glass fibers which are based on the ternary system silicon dioxide-aluminum oxide magnesium oxide or on the quaternary system silicon dioxide-aluminum oxide-magnesium oxide-calcium oxide, where a composition of 58-70 wt % of silicon dioxide (SiO2), 15-30 wt % of aluminum oxide (Al2O3), 5-15 wt % of magnesium oxide (MgO), 0-10 wt % of calcium oxide (CaO), and 0-2 wt % of further oxides, is used, or wherein the fibers of component (C) are glass fibers having a circular cross section with a diameter in the range of 6-13 μm, employed in the form of short glass fiber, or as chopped glass having a length of 2-12 mm.

29. The polyamide molding composition as claimed in claim 1, wherein component (D), if selected as an impact modifier different from (E) or different from (F), is selected from the following group: (block) copolymers based on at least one or on a combination of the following building blocks: polybutadiene, polyisoprene, polyisobutylene, copolymer of butadiene or isoprene with styrene or styrene derivatives and other comonomers, hydrogenated copolymers and or copolymers formed by grafting or copolymerization with acid anhydrides, (meth)acrylic acid and esters thereof, styrene-based block copolymers, ethylene-α-olefin copolymers, ethylene-acrylate or ethylene-butylene-acrylate copolymers, ethylene, propylene, but-1-ene, these systems being or not being present in ionomer form, in which the polymer-bonded carboxyl groups are joined to one another wholly or partly by metal ions.

30. The polyamide molding composition as claimed in claim 1, wherein component (D), if selected as an impact modifier different from (E) or different from (F), is selected from the following group: copolymers of butadiene with styrene that are functionalized by grafting with maleic anhydride, apolar or polar olefin homopolymers and copolymers, formed by grafting with maleic anhydride, and carboxylic acid-functionalized copolymers.

31. The polyamide molding composition as claimed in claim 1, wherein component (D), if selected as a polymer different from (A), (E), and (F), is selected from the following group: PA 6, PA 46, PA 56, PA 66, PA 66/6, PA 69, PA 610, PA 612, PA 614, and LDPE.

32. The polyamide molding composition as claimed in claim 1, wherein component (E) is an ethylene-vinyl acetate copolymer having a vinyl acetate content of 10-20%, the percentages being based on the total mass of ethylene-vinyl acetate copolymer, including any grafting present, or wherein component (E) possesses a molar mass in the range from 30 000 to 300 000 g/mol, or wherein component (E) is grafted or possesses acid or acid anhydride groups which have been introduced by thermal or radical reaction of the main-chain polymer with an unsaturated dicarboxylic anhydride, an unsaturated dicarboxylic acid or an unsaturated dicarboxylic monoalkyl ester, with use of at least one of the following systems: acrylic acid, methacrylic acid, maleic acid, maleic anhydride, maleic monobutyl ester, fumaric acid, aconitic acid, glycidyl acrylate, glycidyl methacrylate, or itaconic anhydride, in a concentration in the range from 0.1 to 6.0 wt %, where the ethylene-vinyl acetate copolymer possesses grafting in a range of 0.5-2.5 wt %, the percentages by weight being based on the total mass of ethylene-vinyl acetate copolymer, including grafting, or wherein component (E) is unhydrolyzed.

33. The polyamide molding composition as claimed in claim 1, wherein component (F) contains no conductivity additives, or no particles of carbon black or of graphite.

34. The polyamide molding composition as claimed in claim 1, wherein additives of component (F) are selected from the following group or a mixture thereof: adhesion promoters; crystallization accelerators; crystallization retardants; antioxidants; antiozonants; light stabilizers; heat stabilizers in the form of at least one of phenols, phosphites, copper halides, cerium oxide hydrates, lanthanum salts; UV stabilizers; UV absorbers; UV blockers; lubricants; mold release agents; plasticizers; processing assistants; antistats; organic and inorganic pigments; dyes and marker substances; nanoparticles in platelet form; pigment-grade carbon black; residues from polymerization processes; chain transfer agents, said chain transfer agents including monoacids or monoamines; or oxygen-, nitrogen- or sulfur-containing metal compounds as stabilizers.

35. The polyamide molding composition as claimed in claim 1, wherein the fibers of component (C) are glass fibers which are composed substantially of the components silicon dioxide, calcium oxide, magnesium oxide, and aluminum oxide, or consist of these components, and the SiO2/(CaO+MgO) weight ratio is between 2.1 and 2.4, or are glass fibers which are based on the ternary system silicon dioxide-aluminum oxidemagnesium oxide or on the quaternary system silicon dioxide-aluminum oxide-magnesium oxide-calcium oxide, where a composition of 58-70 wt % of silicon dioxide (SiO2), 15-30 wt % of aluminum oxide (Al2O3), 5-15 wt % of magnesium oxide (MgO), 0-10 wt % of calcium oxide (CaO), and 0-2 wt % of further oxides selected from the group consisting of zirconium dioxide (ZrO2), boron oxide (B2O3), titanium dioxide (TiO2) and lithium oxide (Li2O), is used, or wherein the fibers of component (C) are glass fibers having a circular cross section with a diameter in the range of 6-13 μm, employed in the form of short glass fiber, or as chopped glass having a length of 2-12 mm.

36. The polyamide molding composition as claimed in claim 1, wherein component (D), if selected as an impact modifier different from (E) or different from (F), is selected from the following group: copolymers of butadiene with styrene that are functionalized by grafting with maleic anhydride, apolar or polar olefin homopolymers and copolymers, formed by grafting with maleic anhydride, and carboxylic acid-functionalized copolymers selected from the group consisting of poly(ethene-co-(meth)acrylic acid) and poly(ethene-co-1-olefin-co-(meth)acrylic acid) in which the acid groups are partially neutralized with metal ions.

* * * * *